United States Patent
Fukui

(10) Patent No.: US 10,862,411 B2
(45) Date of Patent: Dec. 8, 2020

(54) ROTATING ELECTRICAL MACHINE CONTROL DEVICE AND ROTATING ELECTRICAL MACHINE CONTROL METHOD

(71) Applicant: HONDA MOTOR CO., LTD., Tokyo (JP)

(72) Inventor: Kentaro Fukui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/261,612

(22) Filed: Jan. 30, 2019

(65) Prior Publication Data

US 2019/0245462 A1    Aug. 8, 2019

(30) Foreign Application Priority Data

Feb. 8, 2018  (JP) ................................. 2018-021337

(51) Int. Cl.
| | | |
|---|---|---|
| H02P 6/10 | (2006.01) | |
| G10K 9/13 | (2006.01) | |
| H02P 6/17 | (2016.01) | |

(52) U.S. Cl.
CPC .................. *H02P 6/10* (2013.01); *G10K 9/13* (2013.01); *H02P 6/17* (2016.02)

(58) Field of Classification Search
CPC ... H02P 6/10; H02P 27/04; H02P 6/17; G10K 9/13; G10K 11/00
See application file for complete search history.

(56) References Cited

U.S. PATENT DOCUMENTS

2011/0153133 A1* 6/2011 Asahara .................. B60L 50/50
701/22

FOREIGN PATENT DOCUMENTS

| CN | 103248187 | 8/2013 |
|---|---|---|
| JP | 4449035 | 4/2010 |
| JP | 2011-055697 | 3/2011 |
| JP | 2012-115092 | 6/2012 |
| JP | 2012115092 A * | 6/2012 |
| JP | 2012-228138 | 11/2012 |
| JP | 2014-168998 | 9/2014 |
| JP | 2016-063650 | 4/2016 |
| JP | 2017-520444 | 7/2017 |
| WO | 2010/023768 | 3/2010 |

OTHER PUBLICATIONS

Japanese Office Action for Japanese Patent Application No. 2018-021337 dated Jun. 4, 2019.
Japanese Notice of Allowance for Japanese Patent Application No. 2018-021337 dated Dec. 24, 2019.
Chinese Office Action for Chinese Patent Application No. 201910088674.4 dated Jul. 28, 2020.

* cited by examiner

*Primary Examiner* — Eduardo Colon Santana
*Assistant Examiner* — Said Bouziane
(74) *Attorney, Agent, or Firm* — Amin, Turocy & Watson, LLP

(57) ABSTRACT

A rotating electrical machine control device includes a rotating electrical machine, a sensor that detects a state of the rotating electrical machine, and a control unit that controls a current component superimposed on a current supplied to the rotating electrical machine on a basis of detection results of the sensor.

7 Claims, 13 Drawing Sheets

FREQUENCY (Hz)

FREQUENCY (Hz)

ROTATING ELECTRICAL MACHINE CONTROL DEVICE AND ROTATING ELECTRICAL MACHINE CONTROL METHOD

CROSS-REFERENCE TO RELATED APPLICATION

Priority is claimed on Japanese Patent Application No. 2018-021337, filed Feb. 8, 2018, the content of which is incorporated herein by reference.

BACKGROUND OF THE INVENTION

Field of the Invention

The present invention relates to a rotating electrical machine control device and a rotating electrical machine control method.

Description of Related Art

In electric vehicles (EV) and hybrid electric vehicles (HEV), rotating electrical machines (motors) are used. It is known that rotating electrical machines generate a high-order single sound as a sound (i.e., a motor sound) generated during driving. Such a motor sound may impart an unfavorable impression on an occupant of a vehicle.

For example, a rotating electrical machine in which a concave portion is formed in the outer peripheral surface of a rotor is known as a rotating electrical machine which is able to suppress the motor sound to be small. According to this rotating electrical machine, a concave portion is formed in the outer peripheral surface of a rotor to reduce torque pulsation, so that it is possible to suppress the sound generated from the rotating electrical machine to be small (see, for example, Japanese Patent No. 4449035 (hereinafter, Patent Literature 1).

SUMMARY OF THE INVENTION

However, in a technique disclosed in Patent Literature 1, it may be difficult for an occupant having heard a motor sound of a rotating electrical machine to feel comfortable.

An aspect according to the present invention has been made in view of the above-described problems, and an object thereof is to provide a rotating electrical machine control device which can generate a sound capable of invoking comfortable to a person, and a rotating electrical machine control method.

In order to solve the above-described problems and accomplish the object, the present invention adopts the following aspects.

(1) A rotating electrical machine control device according to an aspect of the present invention includes a rotating electrical machine, a sensor that detects a state of the rotating electrical machine, and a control unit that controls a current component superimposed on a current to be supplied to the rotating electrical machine on a basis of detection results of the sensor.

(2) In the aspect (1), the control unit may superimpose a current less than a first frequency on the rotating electrical machine in a case in which a torque included in the detection results of the sensor is equal to or greater than a torque threshold value.

(3) In the aspect (2), the control unit may superimpose a current equal to or higher than the first frequency and equal to or less than a second frequency on the rotating electrical machine in a case in which an acceleration included in the detection results of the sensor is equal to or greater than an acceleration threshold value.

(4) In the aspect (1) or (2), the control unit may superimpose a current equal to or higher than a first frequency and equal to or less than a second frequency on the rotating electrical machine in a case in which a speed of a vehicle which is included in the detection results of the sensor is equal to or greater than a vehicle speed threshold value.

(5) In the aspect (4), the control unit may adjust an amplitude of a superimposed current in accordance with the speed of the vehicle in a case in which the speed of the vehicle which is included in the detection results of the sensor is equal to or greater than the vehicle speed threshold value.

(6) In any one of the aspects (1) to (5), the rotating electrical machine control device may further include a stator that generates a magnetic flux by electrifying coils mounted on a stator core, and a sound generating device that generates a predetermined sound by vibrating a vibration plate with an electromagnetic force caused by the magnetic flux, the vibration plate being provided adjacent to the stator core.

(7) In any one of the aspects (1) to (6), the rotating electrical machine control device may further include a rotor in which a magnet is mounted on a rotor core, and a stator in which coils are mounted in a stator core, in which a non-identical shape portion different from a repetitive shape of an electromagnetic region which is set for each pole in a circumferential direction may be provided on both an outer peripheral surface of the rotor core and an inner peripheral surface of the stator core.

(8) A rotating electrical machine control method according to an aspect of the present invention is a rotating electrical machine control method of a rotating electrical machine control device including a rotating electrical machine, and includes a step of causing a sensor to detect a state of the rotating electrical machine, and a step of causing a control unit to control a current component superimposed on a current supplied to the rotating electrical machine on a basis of detection results of the sensor.

According to the above-described aspects (1) and (8), it is possible to generate a sound capable of invoking comfortable to a person.

According to the above-described aspect (2), it is possible to output a sound expressing power in the case of a high torque.

According to the above-described aspect (3), it is possible to invoke a rising feeling by outputting a large sound in the case of a high torque and acceleration.

According to the above-described aspect (4), it is possible to invoke a rising feeling by outputting a large sound at the time of high-speed movement.

According to the above-described aspect (5), it is possible to secure a sound volume which is not drowned out by road or wind noise.

According to the above-described aspects (6) and (7), it is possible to generate a sound capable of invoking comfortable to a person by the rotation of the rotating electrical machine without consuming power in order to generate a sound.

DETAILED DESCRIPTION OF THE INVENTION

Hereinafter, an embodiment of the present invention will be described with reference to the accompanying drawings. Note that, in drawings used for the following description, the scale of each member may be appropriately changed in order to make each member have a recognizable size. Note that, in the present embodiment, a motor adopted for a driving unit for a vehicle such as a hybrid electric vehicle or an electric vehicle as a rotating electrical machine 1 will be described. However, a configuration of the present invention is not limited to a motor adopted for a driving unit for a vehicle and is also applicable to a motor for power generation and motors for other purposes or a rotating electrical machine (a power generator is included) other than rotating electrical machines for a vehicle.

Figure 1:
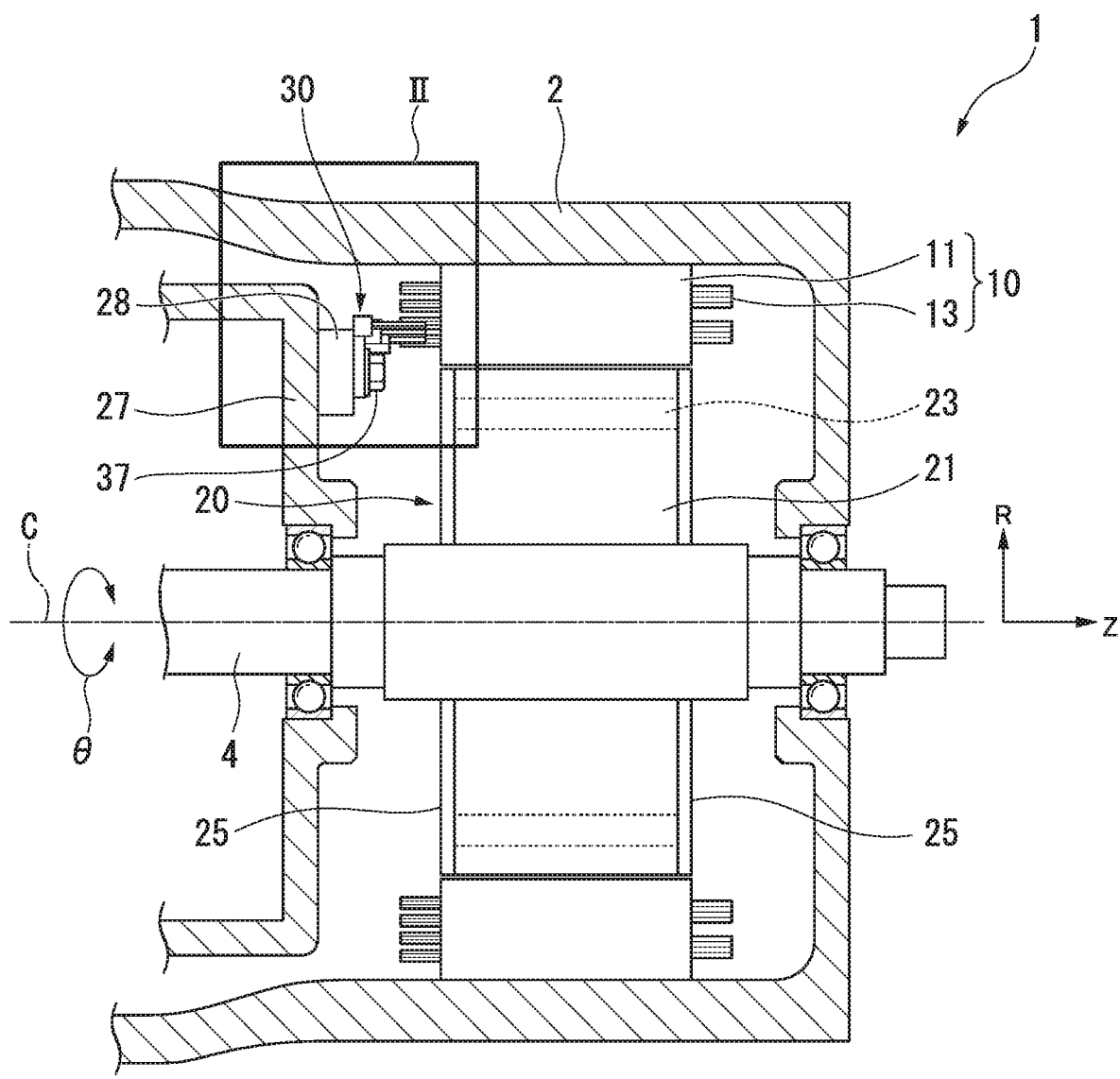
FIG. 1 is a cross-sectional view of a rotating electrical machine according to the present embodiment.

FIG. 1 is a cross-sectional view of a rotating electrical machine according to the present embodiment.

The rotating electrical machine 1 is a motor for traveling which is mounted on a vehicle such as a hybrid electric vehicle or an electric vehicle. As shown in FIG. 1, the rotating electrical machine 1 includes a housing 2, a stator 10, a rotor 20, a shaft 4, and a sound generating device 30.

The housing 2 accommodates the stator 10 and the rotor 20 and rotatably supports the shaft 4. Note that the stator 10, the rotor 20, and the shaft 4 are disposed with an axis C as a common axis. Hereinafter, description will be given on the assumption that a direction in which the axis C extends is referred to as the axial direction, the direction perpendicular to the axis C is referred to as the diameter direction, and the direction around the axis C is referred to as the circumferential direction. In addition, the arrow Z in the drawings represents the axial direction, the arrow R represents the diameter direction, and the arrow θ represents the circumferential direction.

The stator 10 includes a stator core 11, and a plurality of layers (for example, a U phase, a V phase, and a W phase) of coils 13 mounted on the stator core 11. The stator 10 generates a magnetic field due to a current flowing through the coils 13.

The stator core 11 is formed in a cylindrical shape extending in the axial direction. For example, the stator core 11 may be formed by stacking a plurality of electromagnetic steel sheets in the axial direction.

The rotor 20 is disposed on the inner side of the stator 10 in the diameter direction. The rotor 20 includes a rotor core 21, magnets 23 mounted on the rotor core 21, and an end face plate 25 disposed in contact with both end faces of the rotor core 21 in the axial direction. The rotor 20 is rotatably driven by a magnetic field generated in the stator 10 repelling or attracting the magnets 23.

The rotor core 21 is formed in a cylindrical shape uniformly extending in the axial direction and is disposed opposite to an inner peripheral surface 11a (see FIG. 2) of the stator core 11. For example, the rotor core 21 is formed by stacking a plurality of electromagnetic steel sheets in the axial direction. The shaft 4 is inserted on the inner side of the rotor core 21 and is fixed by pressing-in. Thereby, the rotor core 21 is integrated with the shaft 4 and is rotatable around the axis C.

The sound generating device 30 includes a mounting bolt 37 (fastening member). Note that a configuration of the sound generating device 30 will be described later.

The mounting bolt 37 is fastened to, for example, a boss 28 of a partition wall 27. Accordingly, a mounting bracket 31 is attached to the boss 28 of the partition wall 27 by the mounting bolt 37. The partition wall 27 is disposed inside the housing 2.

Next, a configuration of the rotating electrical machine 1 will be described using FIGS. 2 and 3.

Figure 2:
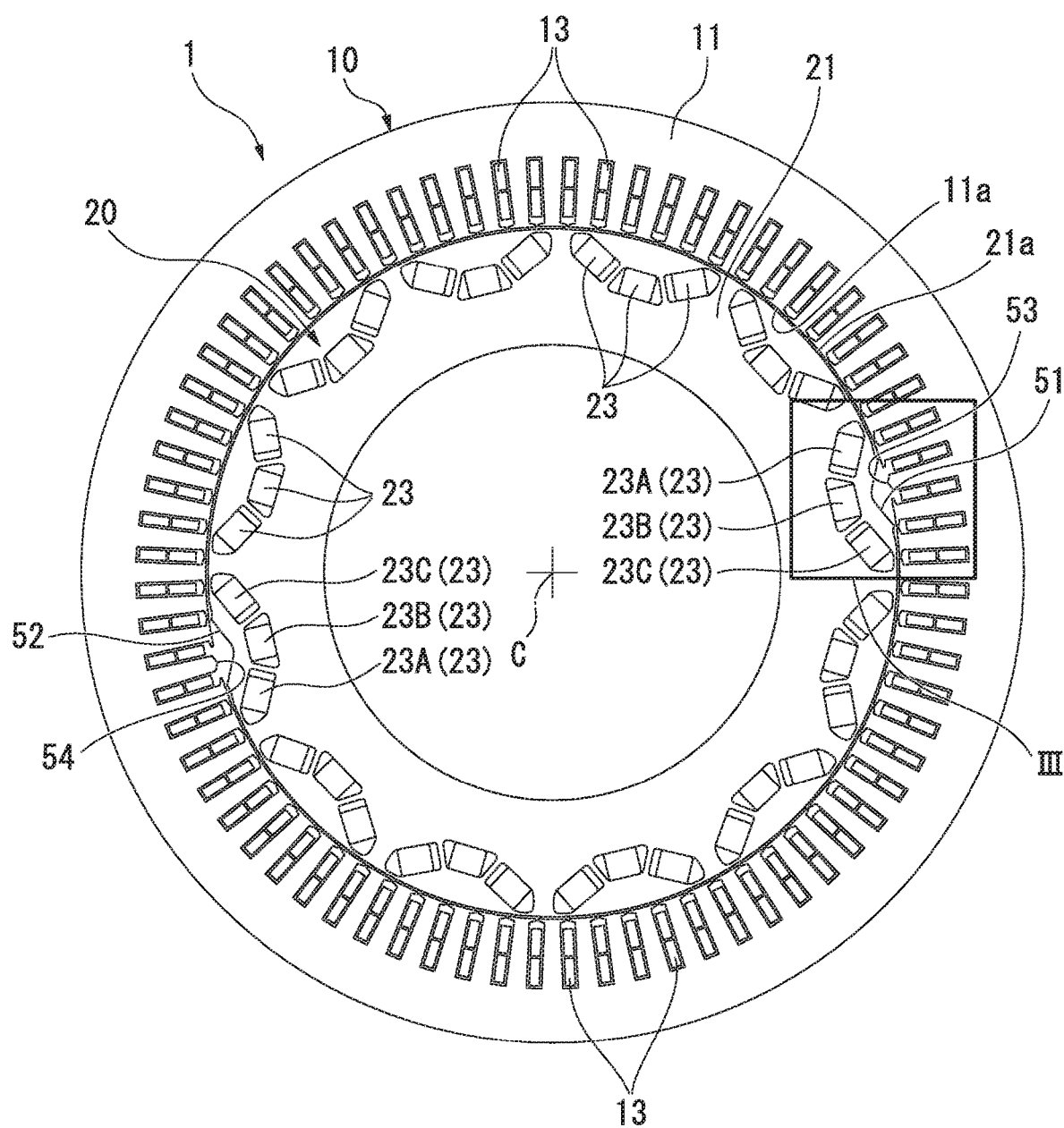
FIG. 2 is a cross-sectional view when a stator and a rotor of the rotating electrical machine according to the present embodiment are cut in a direction intersecting an axis.

FIG. 2 is a cross-sectional view when the stator 10 and the rotor 20 of the rotating electrical machine 1 according to the present embodiment are cut in a direction intersecting an axis. FIG. 3 is a cross-sectional view showing a state where a portion III shown in FIG. 2 is enlarged.

Figure 3:
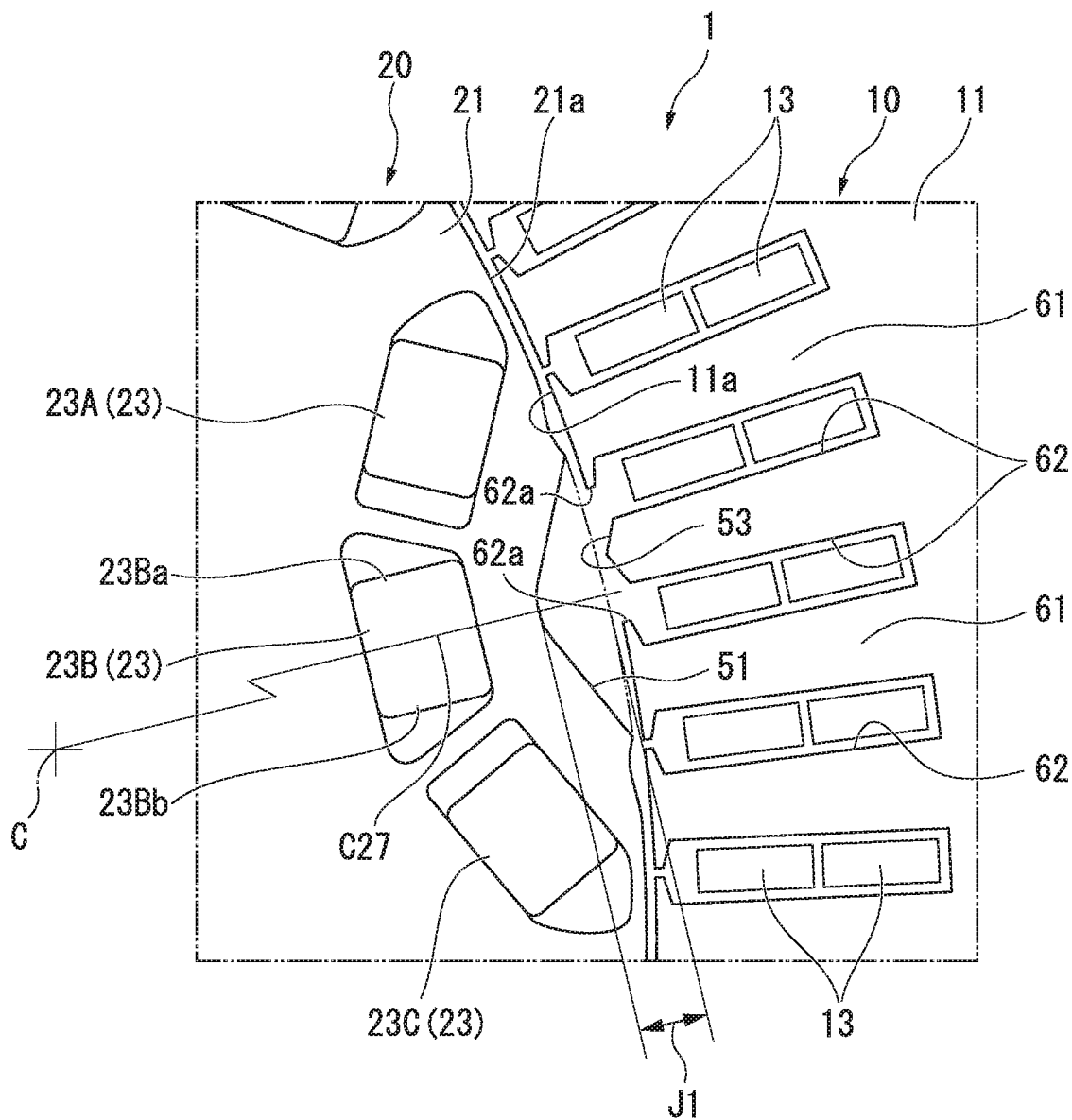
FIG. 3 is a cross-sectional view showing a state where a portion III shown in FIG. 2 is enlarged.

As shown in FIGS. 2 and 3, in the rotor 20, the plurality of magnets 23 are embedded in the rotor core 21. Here, in order to facilitate the understanding of the configuration of the rotor 20, description will be given on the assumption that three magnets 23 disposed in a V-shape when seen from the direction of the axis C among the plurality of magnets 23 are a magnet 23A, a magnet 23B, and a magnet 23C for the sake of convenience.

Among the plurality of magnets 23, the three adjacent magnets of the magnet 23A, the magnet 23B, and the magnet 23C are disposed in a V-shape when seen from the direction of the axis C.

Specifically, the magnet 23B is disposed on the axis C side at a certain distance from an outer peripheral surface 21a of the rotor core 21. The magnet 23A is disposed in a direction away from the magnet 23B from an end 23Ba side of the magnet 23B to be inclined toward the outer peripheral surface 21a of the rotor core 21. The magnet 23C is disposed in a direction away from the magnet 23B from the other end 23Bb side of the magnet 23B to be inclined toward the outer peripheral surface 21a of the rotor core 21.

The three adjacent magnets of the magnet 23A, the magnet 23B, and the magnet 23C are embedded in the rotor core 21 as magnetic poles to alternately have different magnetic poles in the circumferential direction of the rotor core 21.

The rotor core 21 includes a first non-identical shape portion 51 (non-identical shape portion) and a first non-identical shape portion 52 (non-identical shape portion) which are paired. The first non-identical shape portion 51 and the first non-identical shape portion 52 which are paired are formed symmetrically with respect to the axis C on the outer peripheral surface 21a of the rotor core 21.

Hereinafter, the first non-identical shape portion 51 out of the first non-identical shape portion 51 and the first non-identical shape portion 52 which are paired will be described in detail, and a detailed description of the first non-identical shape portion 52 will be omitted.

The first non-identical shape portion 51 is formed in a part on the outer peripheral surface 21a of the rotor core 21 facing the three adjacent magnets of the magnet 23A, the magnet 23B, and the magnet 23C. Specifically, the first non-identical shape portion 51 is formed in a concave shape on the outer peripheral surface 21a between the magnet 23A and the magnet 23C to be recessed in a V-shape on a side opposite to the inner peripheral surface 11a of the stator core 11.

Here, the first non-identical shape portion 51 is disposed on a straight line C27 extending outward in the diameter direction from the axis C. The straight line C27 is a straight line connecting the axis C and the centers of the magnetic poles (i.e., the three magnets of the magnet 23A, the magnet 23B, and the magnet 23C) in the circumferential direction. The center of the first non-identical shape portion 51 in the circumferential direction is disposed on the straight line C27.

In addition, the first non-identical shape portion 51 is formed to have a concave shape in a depth dimension J1. The depth dimension J1 of the first non-identical shape portion 51 is set to, for example, 5 mm.

The first non-identical shape portion 51 and the first non-identical shape portion 52 which are paired are formed to have a shape different from a repetitive shape of an electromagnetic region which is set for each pole in the circumferential direction. The first non-identical shape portion 51 and the first non-identical shape portion 52 which are paired are uniformly disposed in the circumferential direction of the rotor core 21.

The stator core 11 of the stator 10 includes a plurality of teeth 61 arranged along the inner peripheral surface 11a and a plurality of slots 62 formed between the teeth 61. The slots 62 are arranged at a uniform pitch in the circumferential direction along the inner peripheral surface 11a of the stator core 11. The coils 13 are disposed in the slot 62.

The stator core 11 includes a second non-identical shape portion 53 (non-identical shape portion) and a second non-identical shape portion 54 (non-identical shape portion) which are paired.

The second non-identical shape portion 53 and the second non-identical shape portion 54 which are paired are disposed at positions facing the first non-identical shape portion 51 and the first non-identical shape portion 52 which are paired on the inner peripheral surface 11a of the stator core 11.

A sound generating mechanism is constituted by the first non-identical shape portion 51 and the first non-identical shape portion 52 which are paired of the rotor core 21 and the second non-identical shape portion 53 and the second non-identical shape portion 54 which are paired of the stator core 11.

Hereinafter, the second non-identical shape portion 53 out of the second non-identical shape portion 53 and the second non-identical shape portion 54 which are paired will be described in detail, and a detailed description of the second non-identical shape portion 54 will be omitted.

The second non-identical shape portion 53 is formed in a concave shape to be recessed on a side opposite to the rotor core 21 due to communication of slot openings 62a of two adjacent slots 62 on the inner peripheral surface 11a of the stator core 11.

The second non-identical shape portion 53 and the second non-identical shape portion 54 which are paired are formed to have a shape different from a repetitive shape of an electromagnetic region which is set for each pole in the circumferential direction. The second non-identical shape portion 53 and the second non-identical shape portion 54 which are paired are uniformly disposed in the circumferential direction of the stator core 11.

Figure 4A:
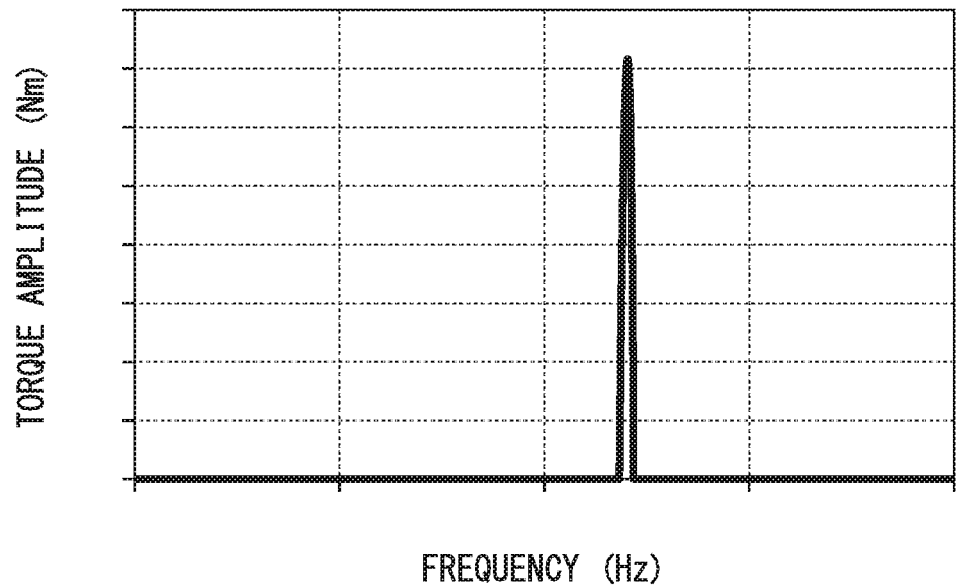
FIG. 4A shows a frequency distribution generated by a rotating electrical machine according to a comparative example.
Figure 4B:
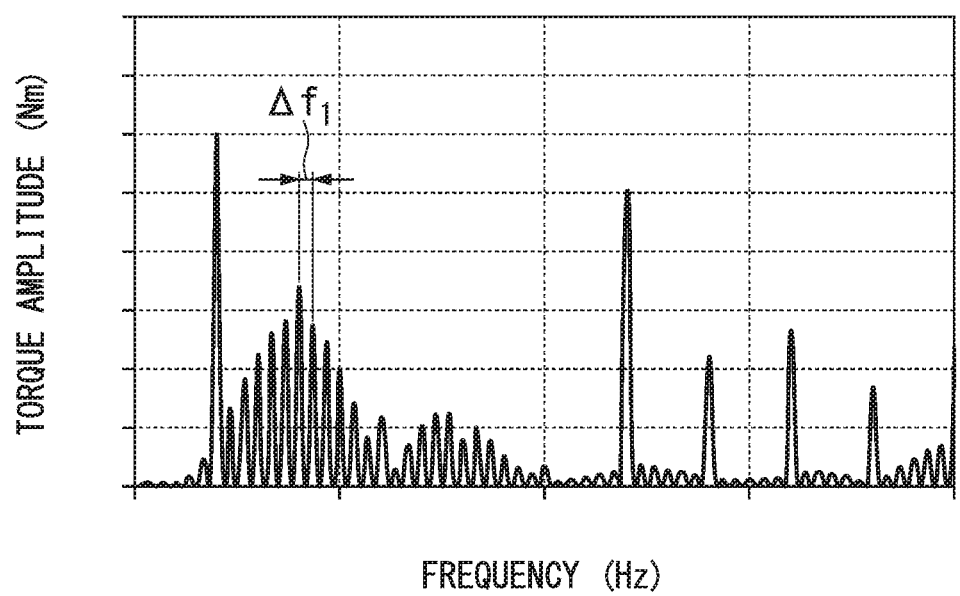
FIG. 4B shows a frequency distribution generated by a rotating electrical machine 1 according to a first embodiment.

Next, a low-order sound generated by the sound generating mechanism constituted by the first non-identical shape portion 51 and the first non-identical shape portion 52 of the rotor core 21 and the second non-identical shape portion 53 and the second non-identical shape portion 54 of the stator core 11 will be described using FIGS. 4A and 4B with reference to FIG. 2. A graph in FIG. 4A shows a frequency distribution generated by a rotating electrical machine according to a comparative example, and a graph in FIG. 4B shows a frequency distribution generated by the rotating electrical machine 1 according to the first embodiment. The comparative example relates to a rotating electrical machine in which the first non-identical shape portion 51 and the second non-identical shape portion 53 are not provided. The first embodiment relates to the rotating electrical machine 1 in which the first non-identical shape portion 51 and the first non-identical shape portion 52 which are paired and the second non-identical shape portion 53 and the second non-identical shape portion 54 which are paired are provided. In FIGS. 4A and 4B, the vertical axis represents a torque amplitude (Nm) and the horizontal axis represents a frequency (Hz).

As shown in FIG. 4A, regarding a motor sound generated by the rotating electrical machine according to the comparative example, a frequency distribution is concentrated on a predetermined frequency. That is, in the rotating electrical machine according to the comparative example, the motor sound is a high-order single sound and is not likely to be a comfortable sound tone for an occupant.

As shown in FIG. 4B, a motor sound generated by the rotating electrical machine 1 according to the present embodiment is dispersed to frequencies in a wide range at intervals of a frequency f1 (Hz). That is, there are different sounds in a wide range at intervals of a frequency f1 (Hz).

As described above, in the rotating electrical machine 1, the first non-identical shape portion 51 and the first non-identical shape portion 52 which are paired are formed at uniform intervals in the circumferential direction on the outer peripheral surface 21a of the rotor core 21. In addition, the second non-identical shape portion 53 and the second non-identical shape portion 54 which are paired are formed at uniform intervals in the circumferential direction on the inner peripheral surface 11a of the stator core 11.

In this manner, in a case in which the first non-identical shape portion 51 and the first non-identical shape portion 52 which are paired and the second non-identical shape portion 53 and the second non-identical shape portion 54 which are paired are formed at uniform intervals in the circumferential direction, a relation of the following Expression (1) is established for the frequency f1.

$$f1\ (Hz) = (\text{rotation speed of rotor core 21}) \times (\text{the number of non-identical shape portions}) \quad (1)$$

Thereby, in the present embodiment, it is possible to generate different sounds in a wide range at intervals of a frequency f1 (Hz) as a motor sound of the rotating electrical machine 1.

In this manner, according to the rotating electrical machine 1 of the present embodiment, the first non-identical shape portion 51 and the first non-identical shape portion 52 which are paired provided on the outer peripheral surface 21a of the rotor core 21 are formed to have a shape different from a repetitive shape of an electromagnetic region which is set for each pole in the circumferential direction. Further, in the present embodiment, the second non-identical shape portion 53 formed on the inner peripheral surface 11a of the stator core 11 is formed to have a shape different from a repetitive shape of an electromagnetic region which is set for each pole in the circumferential direction. Note that, in the present embodiment, the components shown in FIGS. 2 to 3 are also referred to as asymmetry electromagnetic portions.

Accordingly, the rotating electrical machine 1 can generate a low-order sound with the first non-identical shape portion 51 and the first non-identical shape portion 52 which are paired and the second non-identical shape portion 53 and the second non-identical shape portion 54 which are paired. Further, in the present embodiment, the low-order sound generated by the first non-identical shape portion 51 and the first non-identical shape portion 52 which are paired and the second non-identical shape portion 53 and the second non-identical shape portion 54 which are paired can be added to a basic-order sound (i.e., a high-order single sound) of the rotating electrical machine 1. Here, the basic order of the rotating electrical machine 1 is expressed by the following Expression (2).

$$(\text{Basic order of rotating electrical machine 1}) = (\text{the rotational speed of rotating electrical machine 1}) \times (\text{the number of antipoles of rotating electrical machine 1}) \quad (2)$$

In this manner, in the present embodiment, a low-order sound is added to a basic-order sound of the rotating electrical machine 1 to synthesize the low-order sound and the basic-order sound, so that it is possible to diffuse a frequency distribution of a motor sound in a wide range at intervals of a frequency f1 (Hz).

As a result, the rotating electrical machine 1 according to the present embodiment can generate a motor sound capable of invoking a rising feeling and comfortable to a driver.

In addition, according to the rotating electrical machine 1 of the present embodiment, even when a low-order sound generated by the first non-identical shape portion 51 and the first non-identical shape portion 52 which are paired and the second non-identical shape portion 53 and the second non-identical shape portion 54 which are paired is added, a basic-order torque ripple of the rotating electrical machine 1 can be left as it is without being canceled out. Thereby, in the present embodiment, it is possible to generate a sound capable of invoking a rising feeling and comfortable to a driver without degrading a basic performance of the rotating electrical machine 1.

Further, in the present embodiment, the first non-identical shape portion 51 and the first non-identical shape portion 52 which are paired and the second non-identical shape portion 53 and the second non-identical shape portion 54 which are paired are formed in both the rotor core 21 and the stator core 11. Accordingly, in the present embodiment, for example, it is possible to generate amplitudes (torque amplitudes) of various orders by changing the depth dimension of the first non-identical shape portion. Additionally, in the present embodiment, it is also possible to adjust frequencies generated by the rotating electrical machine 1 by changing the number of asymmetrical shapes.

Here, in the present embodiment, the first non-identical shape portion 51 and the first non-identical shape portion 52 which are paired of the rotor core 21 are formed in a concave shape, and the second non-identical shape portion 53 and the second non-identical shape portion 54 which are paired of the stator core 11 are formed in a concave shape. Accordingly, in the present embodiment, the first non-identical shape portion 51 and the first non-identical shape portion 52 which are paired and the second non-identical shape portion 53 and the second non-identical shape portion 54 which are paired do not disturb the rotation of the rotor 20.

Further, in the present embodiment, the first non-identical shape portion 51 and the first non-identical shape portion 52 which are paired and the second non-identical shape portion 53 and the second non-identical shape portion 54 which are paired are formed in a concave shape, and thus it is not necessary to adjust a gap between the rotor core 21 and the stator core 11 in association with the first non-identical shape portion 51 and the first non-identical shape portion 52 which are paired and the second non-identical shape portion 53 and the second non-identical shape portion 54 which are paired.

Thereby, in the present embodiment, it is possible to form the first non-identical shape portion 51 and the first non-identical shape portion 52 which are paired and the second non-identical shape portion 53 and the second non-identical shape portion 54 which are paired in the rotating electrical machine 1 in a state where the costs of the rotating electrical machine 1 are minimized.

In the present embodiment, a basic sound during traveling of a vehicle (hereinafter, also referred to as a basic sound) is generated by the configuration described using FIGS. 2 to 3.

Further, in the present embodiment, a sound is added to a basic sound in accordance with a torque generated by the rotating electrical machine 1 by using a configuration of the sound generating device 30 to be described below.

Thereby, according to the present embodiment, it is possible to generate a light and a comfortable sound by mixing a different order with a basic sound generated by the rotary electric machine 1.

Next, a configuration example of the sound generating device 30 will be described with reference to FIGS. 5 to 7.

Figure 5:
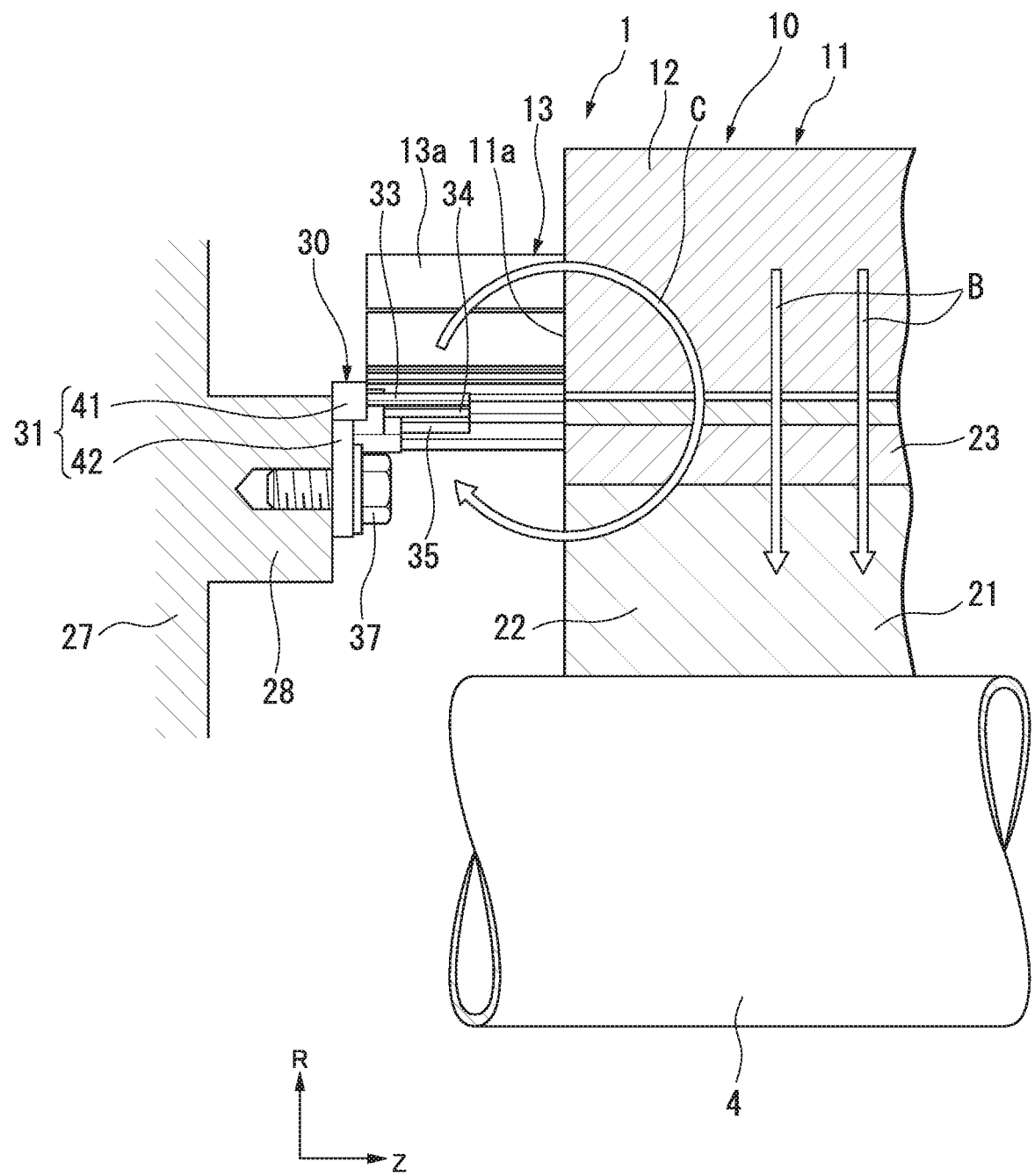
FIG. 5 is an enlarged cross-sectional view of a portion II shown in FIG. 1.

FIG. 5 is an enlarged cross-sectional view of a portion II shown in FIG. 1. FIG. 6 is a cross-sectional view showing the sound generating device 30 of the rotating electrical machine according to the present embodiment. FIG. 7 is a perspective view showing the rotating electrical machine 1 according to the present embodiment. Note that, in the present embodiment, the sound generating device 30 having a configuration shown in FIGS. 5 to 7 is also referred to as a leakage magnetic flux device.

Figure 6:
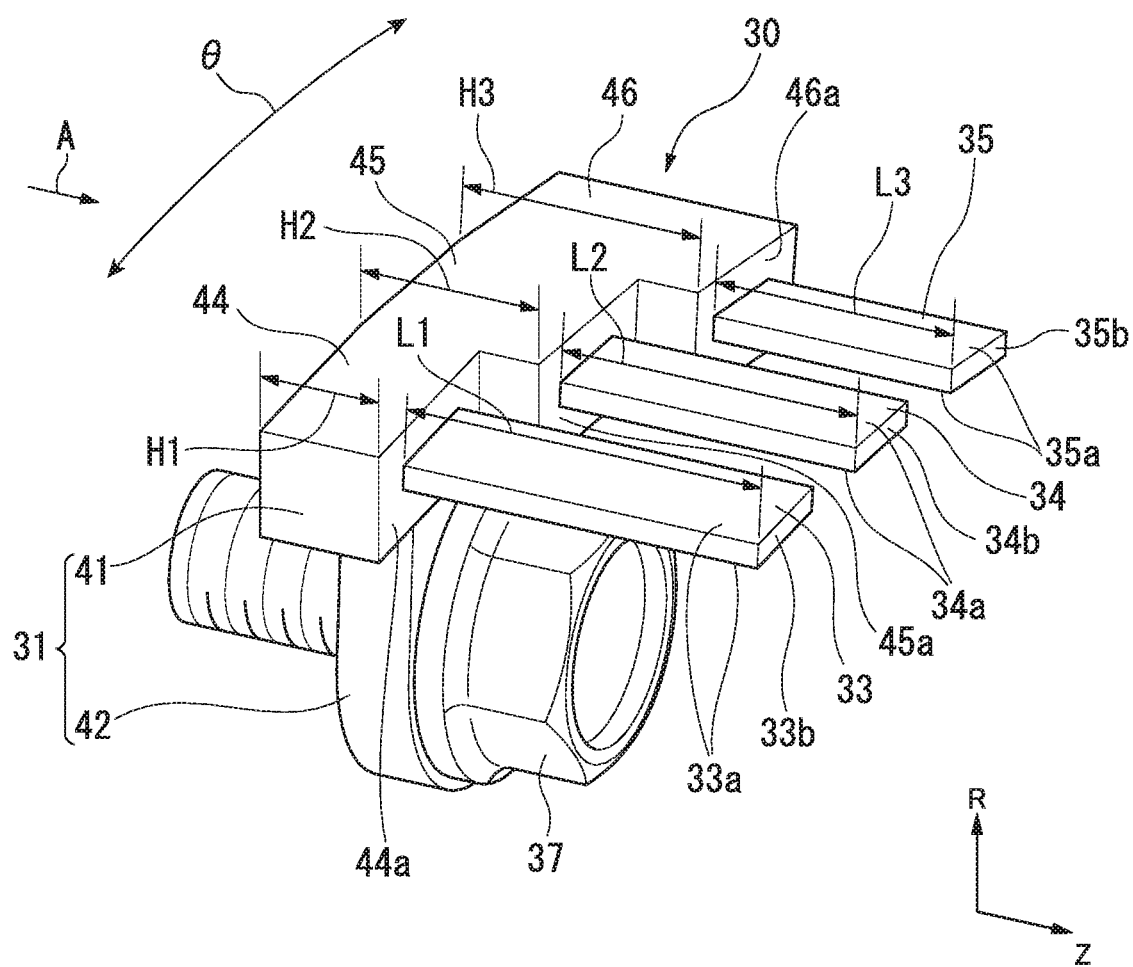
FIG. 6 is a cross-sectional view showing a sound generating device of the rotating electrical machine according to the present embodiment.
Figure 7:
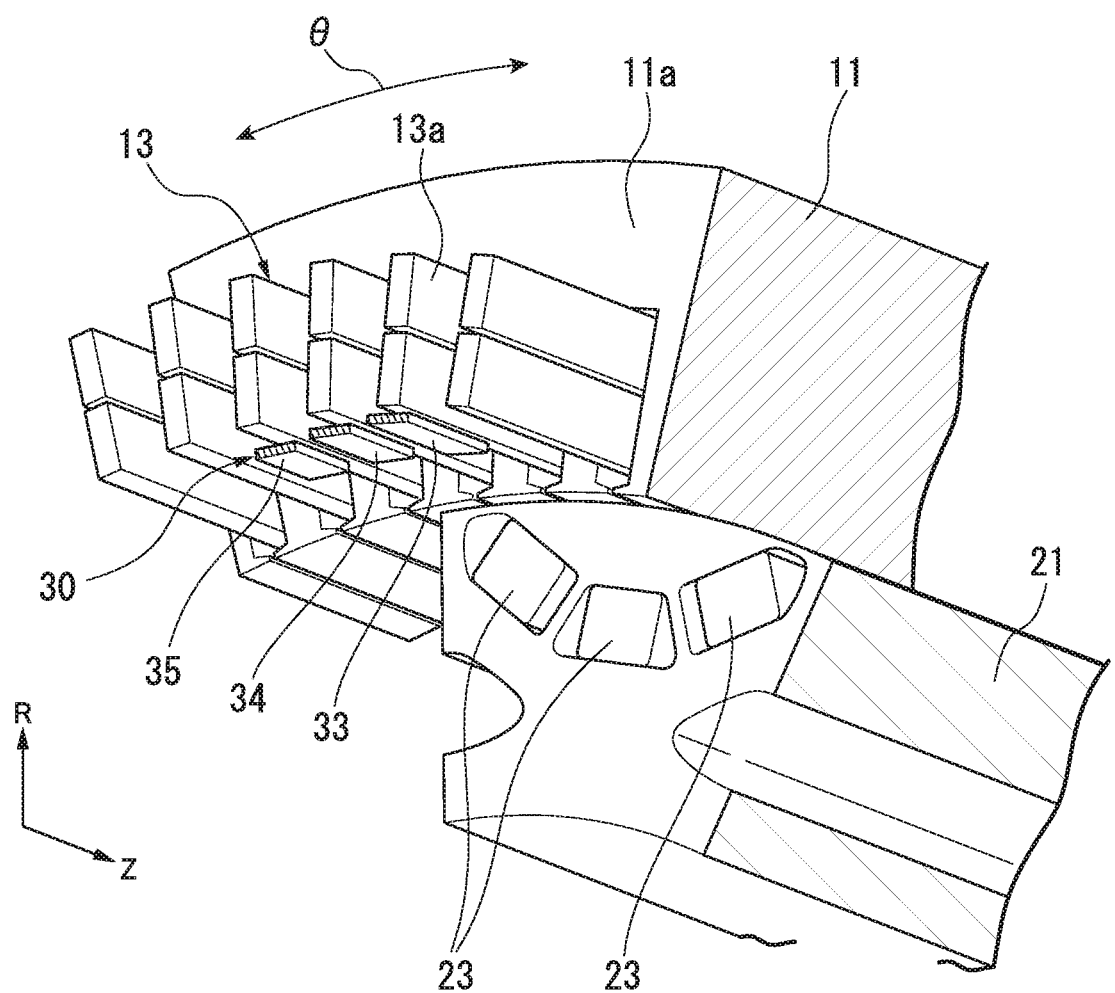
FIG. 7 is a perspective view showing the rotating electrical machine according to the present embodiment.

As shown in FIGS. 5 to 7, the sound generating device 30 includes a mounting bracket 31, a plurality of vibration plates 33 to 35, and a mounting bolt 37. Note that, in FIGS. 5 to 7, for example, a first vibration plate 33, a second vibration plate 34, and a third vibration plate 35 are illustrated as the plurality of vibration plates 33 to 35, but the invention is not limited thereto. Further, FIG. 7 shows a state where the mounting bracket 31 and the mounting bolt 37 are removed in order to facilitate understanding of the configuration of the sound generating device 30.

The mounting bracket 31 is formed of a resin material and includes a base 41 and an attachment portion 42. The base 41 includes a first support base 44, a second support base 45, and a third support base 46. In the base 41, the first support base 44, the second support base 45, and the third support base 46 are formed in this order in a counterclockwise direction in the circumferential direction in a side view seen from the direction of an arrow A (see FIG. 6).

The first support base 44 is formed to have a height dimension H1 in the axial direction. The second support base 45 is formed to have a height dimension H2 in the axial direction. The third support base 46 is formed to have a height dimension H3 in the axial direction. Regarding the height dimension H1 of the first support base 44, the height dimension H2 of the second support base 45, and the height dimension H3 of the third support base 46, H1 is configured to be shorter than H2, and H3 is configured to be longer than H2. That is, the second support base 45 is disposed to be closer to the inner peripheral surface 11a which is the side surface of the stator core 11 than the first support base 44. In addition, the third support base 46 is disposed to be closer to the inner peripheral surface 11a of the stator core 11 than the second support base 45.

The attachment portion 42 is integrally formed in the base 41. Specifically, the attachment portion 42 protrudes inward in the diameter direction from a surface on the inner side of the base 41 in the diameter direction. An attachment hole (not shown) penetrates the attachment portion 42 in the axial direction. The mounting bolt 37 passes through the attachment hole.

For example, the first vibration plate 33, the second vibration plate 34, and the third vibration plate 35 are attached to the base 41.

Specifically, for example, a base end of the first vibration plate 33 is integrally attached to the first support base 44 by insert molding. The first vibration plate 33 extends toward the inner peripheral surface 11a of the stator core 11 from a first opposite surface 44a of the first support base 44. The first vibration plate 33 is, for example, an electromagnetic steel plate (metal piece) which is processed into the form of a flat plate with a pair of flat surfaces 33a and formed in a rectangular shape when seen in a plan view. The first vibration plate 33 is formed to have a length dimension L1 from the first opposite surface 44a to a distal end 33b.

In addition, for example, the base end of the second vibration plate 34 is integrally attached to the second support base 45 by insert molding. The second vibration plate 34 extends toward the inner peripheral surface 11a of the stator core 11 from a second opposite surface 45a of the second support base 45. The second vibration plate 34 is, for example, an electromagnetic steel sheet (metal piece) which is processed into the form of a flat plate with a pair of flat surfaces 34a and formed in a rectangular shape when seen in a plan view. The second vibration plate 34 is formed to have a length dimension L2 from the second opposite surface 45a to a distal end 34b.

Further, for example, the base end of the third vibration plate 35 is integrally attached to the third support base 46 by insert molding. The third vibration plate 35 extends toward the inner peripheral surface 11a of the stator core 11 from a third opposite surface 46a of the third support base 46. The third vibration plate 35 is, for example, an electromagnetic steel plate (metal piece) which is processed into the form of a flat plate with a pair of flat surfaces 35a and formed in a rectangular shape when seen in a plan view. The third vibration plate 35 is formed to have a length dimension L3 from the third opposite surface 46a to a distal end 35b.

The distal end 33b of the first vibration plate 33, the distal end 34b of the second vibration plate 34, and the distal end 35b of the third vibration plate 35 are formed flush with each other in the circumferential direction. In addition, regarding the length dimension L1 of the first vibration plate 33, the length dimension L2 of the second vibration plate 34, and the length dimension L3 of the third vibration plate 35, L1 is set to be longer than L2, and L3 is set to be shorter than L2. In this manner, regarding the first vibration plate 33, the second vibration plate 34, and the third vibration plate 35, the length dimensions L1, L2, and L3 are different from each other.

In addition, the first vibration plate 33, the second vibration plate 34, and the third vibration plate 35 are provided adjacent to the inner peripheral surface 11a of the stator core 11 in a state where the mounting bracket 31 is attached to the boss 28 of the partition wall 27 using the mounting bolt 37.

Further, the first vibration plate 33 is disposed such that the pair of flat surfaces 33a intersect (are perpendicular to) the diameter direction. Further, the second vibration plate 34 is disposed such that the pair of flat surfaces 34a intersect (are perpendicular to) the diameter direction. In addition, the third vibration plate 35 is disposed such that the pair of flat surfaces 35a intersect (are perpendicular to) the diameter direction.

In addition, the first vibration plate 33, the second vibration plate 34, and the third vibration plate 35 are disposed along, for example, coil ends (crossover coils) 13a of the coils 13.

In addition, the first vibration plate 33, the second vibration plate 34, and the third vibration plate 35 are disposed side by side in the circumferential direction of the stator core 11 to extend in the axial direction of the stator core 11.

In addition, the first vibration plate 33 is supported by the first support base 44. The second vibration plate 34 is supported by the second support base 45. The third vibration plate 35 is supported by the third support base 46.

Accordingly, the distal end 33b of the first vibration plate 33, the distal end 34b of the second vibration plate 34, and the distal end 35b of the third vibration plate 35 are disposed at the same distance from the inner peripheral surface 11a of the stator core 11. That is, the first vibration plate 33, the second vibration plate 34, and the third vibration plate 35 are disposed adjacent to each other at the same distance from the inner peripheral surface 11a of the stator core 11.

A magnetic flux is generated by electrifying the coils 13 of the rotating electrical machine 1. The generated magnetic flux is transmitted inside a stator yoke 12 of the stator core 11 and a rotor yoke 22 of the rotor core 21 as indicated by an arrow B shown in FIG. 5. Here, a portion of the generated magnetic flux leaks to the outside of the stator yoke 12 and the rotor yoke 22 (i.e., the vicinity of the inner peripheral surface 11a of the stator core 11) as indicated by an arrow C shown in FIGS. 1 and 5 in a high-load state where a high current is applied to the coils 13 of the rotating electrical machine 1.

Here, the first vibration plate 33, the second vibration plate 34, and the third vibration plate 35 are disposed adjacent to each other at the same distance from the inner peripheral surface 11a of the stator core 11.

Further, the first vibration plate 33, the second vibration plate 34, and the third vibration plate 35 are disposed so as to be easily excited by the magnetic flux leaking to the outside, with the flat surfaces 33a, 34a, and 35a facing a direction intersecting the magnetic flux.

Accordingly, it is possible to excite and vibrate the first vibration plate 33, the second vibration plate 34, and the third vibration plate 35 with an electromagnetic force generated due to the magnetic flux leaking to the outside.

It is possible to generate a predetermined sound (vibration sound) from the first vibration plate 33, the second vibration plate 34, and the third vibration plate 35 by vibrating the first vibration plate 33, the second vibration plate 34, and the third vibration plate 35. Accordingly, it is possible to superimpose the sound generated from the first vibration plate 33, the second vibration plate 34, and the third vibration plate 35 on a motor sound. Thereby, it is possible to invoke the motor sound as a sound capable of invoking a rising feeling and comfortable to a person.

Here, the first vibration plate 33, the second vibration plate 34, and the third vibration plate 35 are provided adjacent to the inner peripheral surface 11a of the stator core 11. Accordingly, it is possible to vibrate the first vibration plate 33, the second vibration plate 34, and the third vibration plate 35 using a magnetic flux leaking to the outside of the stator core 11 in the magnetic flux generated by electrifying the coils 13. Thereby, it is possible to invoke a motor sound without exerting influence on the performance of the rotating electrical machine 1.

In addition, the sound generating device 30 includes the first vibration plate 33, the second vibration plate 34, and the third vibration plate 35, so that it is possible to change a sound generated by vibration of each of the first vibration plate 33, the second vibration plate 34, and the third vibration plate 35. Thereby, it is possible to suitably adjust the tone of the motor sound with the sound generated by vibration of the first vibration plate 33, the second vibration plate 34, and the third vibration plate 35.

Further, for example, it is possible to change a vibration frequency (resonance frequency) of each of the first vibration plate 33, the second vibration plate 34, and the third vibration plate 35 by making the length dimensions L1, L2, and L3 of the first vibration plate 33, the second vibration plate 34, and the third vibration plate 35 different from each other. Thereby, it is possible to finely adjust the tone of the motor sound with a sound generated by vibration of the first vibration plate 33, the second vibration plate 34, and the third vibration plate 35.

Next, an example of a relationship between the rotational speed of the rotating electrical machine 1 and a main frequency component of a sound generated by the sound generating device 30 will be described.

Figure 8:
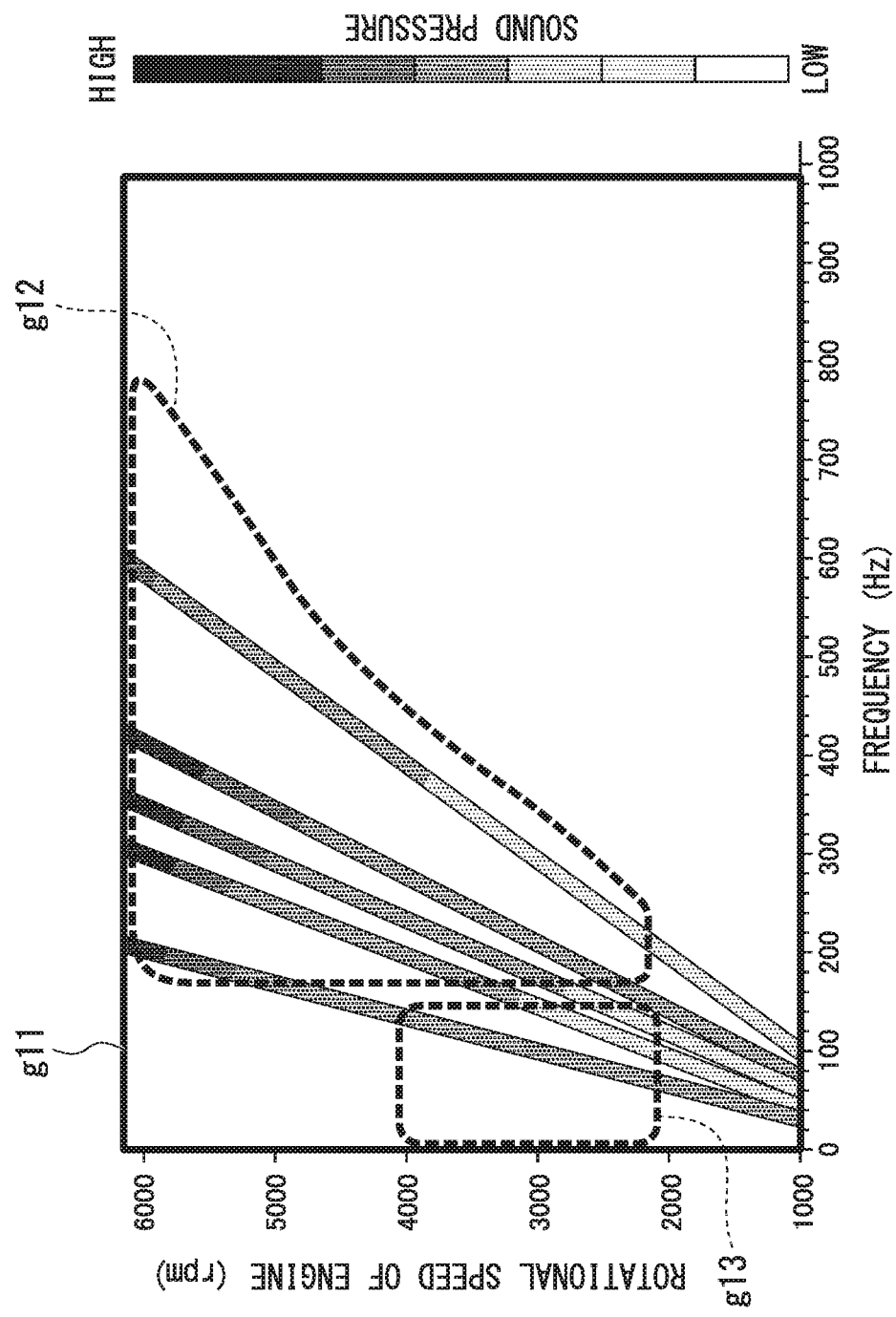
FIG. 8 is a diagram showing an example of a relationship between the rotational speed of the rotating electrical machine according to the present embodiment and a main frequency component of a sound generated by the sound generating device.

FIG. 8 is a diagram showing an example of a relationship between the rotational speed of the rotating electrical machine 1 according to the present embodiment and a main frequency component of a sound generated by the sound generating device 30. In FIG. 8, the horizontal axis represents a superimposition frequency, and the left vertical axis represents the rotational speed of the rotating electrical machine 1. In addition, the right vertical axis represents a sound pressure.

A region denoted by reference numeral g11 is a region having a low sound pressure and is a region where a person feels quiet without noise.

A region denoted by reference numeral g12 is, for example, a region where the rotational speed is 2000 to 6000 rpm and a frequency is 150 Hz or more, and is a region where a person feels light (sporty feeling).

A region denoted by reference numeral g13 is, for example, a region where the rotational speed is 2000 to 4000 rpm and a frequency is 150 Hz or less, and is a region where a person feels strength (a feeling of power) by a sound component.

In the present embodiment, as described above, a basic sound is generated by a asymmetry electromagnetic portion, and additionally, a sound having a frequency and a sound pressure as shown in FIG. 8 is generated by vibrating the first vibration plate 33, the second vibration plate 34, and the third vibration plate 35 of the sound generating device 30 by a leakage magnetic flux of the rotating electrical machine 1. Note that, in the present embodiment, for example, a heavy low-pitched sound of 150 Hz or less is generated by adjusting the length dimensions L1, L2, and L3 of the first vibration plate 33, the second vibration plate 34, and the third vibration plate 35.

Next, a configuration example of a rotating electrical machine control device 100 will be described.

Figure 9:
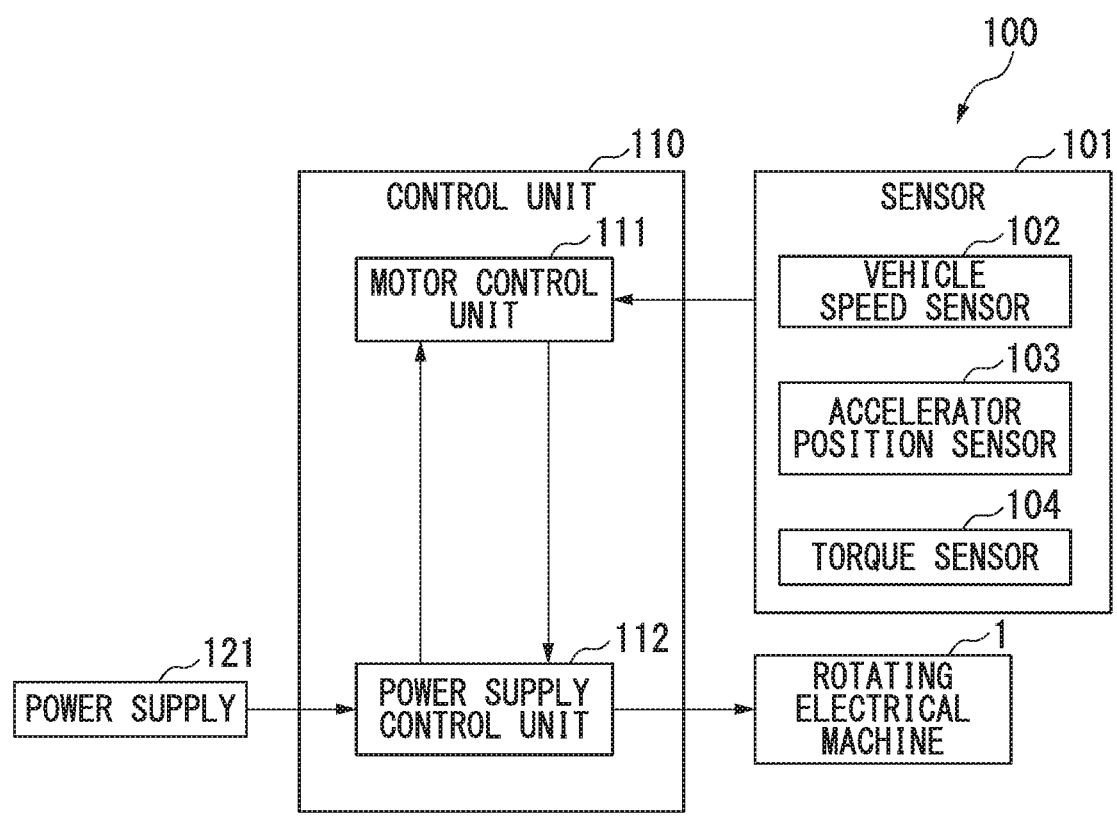
FIG. 9 is a diagram showing a configuration example of a rotating electrical machine control device according to the present embodiment.

FIG. 9 is a diagram showing a configuration example of the rotating electrical machine control device 100 according to the present embodiment. As shown in FIG. 9, the rotating electrical machine control device 100 includes a sensor 101, a control unit 110, a power supply 121, and the rotating electrical machine 1. The sensor 101 includes a vehicle speed sensor 102, an accelerator position sensor 103, and a torque sensor 104. The control unit 110 includes a motor control unit 111 and a power supply control unit 112. Note that the rotating electrical machine control device 100 is mounted on a vehicle.

The vehicle speed sensor 102 is, for example, an acceleration sensor. The vehicle speed sensor 102 detects the speed of the vehicle and outputs detection results obtained by the detection to the control unit 110.

The accelerator position sensor 103 detects the amount of stepping and the speed of stepping speed of an accelerator pedal and outputs detection results obtained by the detection to the control unit 110.

The torque sensor 104 detects a generated torque of the rotating electrical machine 1 and outputs detection results obtained by the detection to the control unit 110.

The power supply 121 is a battery. The power supply 121 supplies power to the power supply control unit 112. Note that the power supply 121 may include, for example, a DC/DC converter (direct current-direct current converter) (not shown).

The control unit 110 includes an inverter which is a device controlling the rotational speed of the rotating electrical machine 1 by changing a power supply frequency to be supplied to the rotating electrical machine 1.

The motor control unit 111 outputs an instruction for the rotating electrical machine 1 to the power supply control unit 112 on the basis of detection results output by the sensor 101. The motor control unit 111 outputs an instruction for the amplitude and the frequency of a current to be superimposed on the rotating electrical machine 1 to the power supply control unit 112 on the basis of detection results output by the sensor 101. The motor control unit 111 receives power to be supplied by the power supply 121 through the power supply control unit 112. In addition, the motor control unit 111 previously stores a relationship between the speed of the vehicle and the amplitude of a current to be superimposed. Further, the motor control unit 111 previously stores a relationship between the speed of the vehicle and the frequency of a current to be superimposed. In addition, the motor control unit 111 previously stores a threshold value of a torque (torque threshold value), a threshold value of an acceleration (acceleration threshold value), and a threshold value of the speed of the vehicle (vehicle speed threshold value).

The power supply control unit 112 controls the rotation of the rotating electrical machine 1 in accordance with an instruction output by the motor control unit 111. The power supply control unit 112 controls the amplitude and the frequency of a current to be superimposed on the rotating electrical machine 1 in accordance with an instruction output by the motor control unit 111.

Next, an example of control performed by the control unit 110 will be described.

Figure 10:
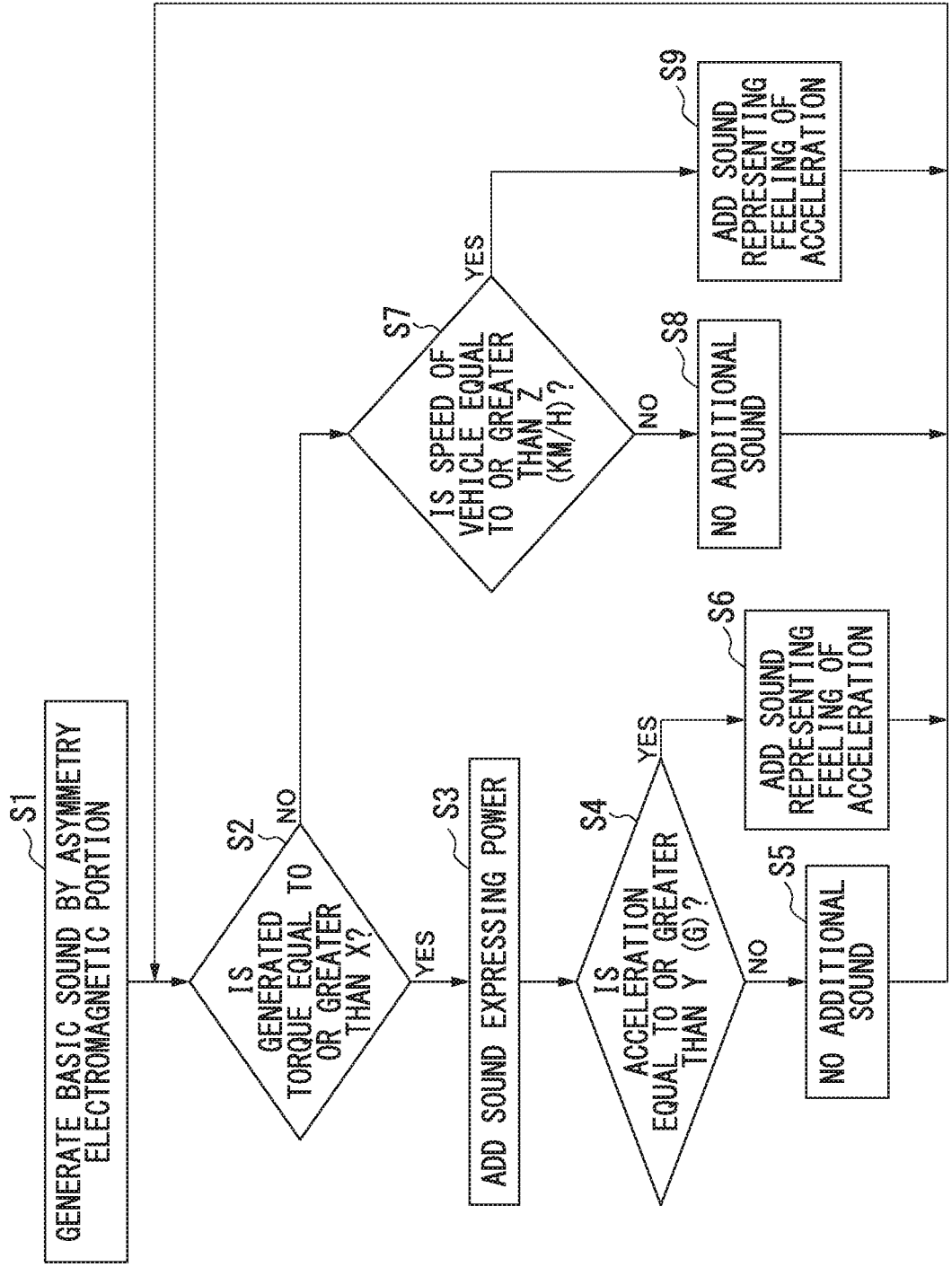
FIG. 10 is a flowchart showing an example of control performed by a control unit according to the present embodiment.

FIG. 10 is a flowchart showing an example of control performed by the control unit 110 according to the present embodiment.

(Step S1) The motor control unit 111 outputs an instruction for the rotating electrical machine 1 to the power supply control unit 112 on the basis of detection results output by the sensor 101 during traveling of a vehicle. Subsequently, the power supply control unit 112 controls the rotation of the rotating electrical machine 1 in accordance with the instruction output by the motor control unit 111. The control unit 110 generates a basic sound by the above-described asymmetry electromagnetic portion by rotating the rotating electrical machine 1.

(Step S2) The motor control unit 111 acquires detection results output by the torque sensor 104. Subsequently, the motor control unit 111 determines whether or not a generated torque is equal to or greater than a threshold value X (Nm) on the basis of the acquired detection result. In a case in which the motor control unit 111 determines that the generated torque is equal to or greater than the threshold value X (Nm) (Step S2; YES), the motor control unit 111 proceeds to the process of step S3. In a case in which the motor control unit 111 determines that the generated torque is less than the threshold value X (Nm) (Step S2; NO), the motor control unit 111 proceeds to the process of step S7.

(Step S3) The motor control unit 111 outputs an instruction for adding a sound expressing power to the power supply control unit 112 by superimposing, for example, a current having a frequency equal to or less than 150 Hz (first frequency). Subsequently, the power supply control unit 112 superimposes a component having a frequency equal to or less than 150 Hz on a current applied to the rotating electrical machine 1 in accordance with the instruction output by the motor control unit 111. After this processing is performed, the control unit 110 proceeds to the process of step S4.

(Step S4) The motor control unit 111 acquires detection results output by the accelerator position sensor 103. Subsequently, the motor control unit 111 determines whether or not an acceleration is equal to or greater than a threshold value Y (G) on the basis of the acquired detection result. In a case in which the motor control unit 111 determines that the acceleration is equal to or greater than the threshold value Y (G) (Step S4; YES), the motor control unit 111 proceeds to the process of step S6. In a case in which the motor control unit 111 determines that the acceleration is less than the threshold value Y (G) (Step S4; NO), the motor control unit 111 proceeds to the process of step S5. Note that the motor control unit 111 may determine an acceleration on the basis of, for example, detection results of the vehicle speed sensor 102 and the torque sensor 104.

(Step S5) The motor control unit 111 does not output an instruction to the power supply control unit 112. Alternatively, the motor control unit 111 may output an instruction requesting no additional sound to the power supply control unit 112. This state is a state where a torques is high and an acceleration is low and is, for example, a slope climbing state. After this processing is performed, the control unit 110 proceeds to the process of step S2.

(Step S6) The motor control unit 111 outputs an instruction for adding a sound representing a feeling of acceleration to the power supply control unit 112 by superimposing, for example, a current having a frequency of approximately 150 Hz to 1000 Hz (second frequency). This state is a state where a torque is high and an acceleration is high and is, for example, an acceleration state. In addition, a sound generated in this state is also a sound imaging high-speed movement in addition to strength. After this processing is performed, the control unit 110 proceeds to the process of step S2.

(Step S7) The motor control unit 111 acquires detection results output by the vehicle speed sensor 102. Subsequently, the motor control unit 111 determines whether or not the speed of the vehicle is equal to or greater than a threshold value Z (km/h) on the basis of the acquired detection result. In a case in which the motor control unit 111 determines that the speed of the vehicle is equal to or greater than the threshold value Z (km/h) (Step S7; YES), the motor control unit 111 proceeds to the process of step S9.

In a case in which the motor control unit 111 determines that the speed of the vehicle is less than the threshold value Z (km/h) (Step S7; NO), the motor control unit 111 proceeds to the process of step S8.

(Step S8) The motor control unit 111 does not output an instruction to the power supply control unit 112. Alternatively, the motor control unit 111 may output an instruction requesting no additional sound to the power supply control unit 112. This state is a state where the speed of the vehicle is low and is, for example, a state where the vehicle is traveling at low speed. After this processing is performed, the control unit 110 proceeds to the process of step S2.

(Step S9) The motor control unit 111 outputs an instruction for adding a sound representing a feeling of acceleration to the power supply control unit 112 by superimposing, for example, a current having a frequency of approximately 150 Hz to 1000 Hz. This state is a state where the speed of the vehicle is low and is, for example, a state where the vehicle is traveling at high speed. Note that the motor control unit 111 adjusts the amplitude of a harmonic current in accordance with the speed of the vehicle. Further, the motor control unit 111 performs control so that the frequency of the harmonic current is increased in accordance with the speed of the vehicle. After this processing is performed, the control unit 110 proceeds to the process of step S2.

That is, in the present embodiment, a harmonic current is superimposed when an acceleration is equal or greater than a threshold value Y, so that it is possible to invoke a rising feeling by outputting a large sound during acceleration.

Further, in the present embodiment, the control unit 110 adjusts the amplitude of the harmonic current in accordance with the speed of the vehicle. The reason for this is to secure a sound volume which is not drowned out by road or wind noise.

Further, in the present embodiment, the control unit 110 increases the frequency of the harmonic current in accordance with the speed of the vehicle. The reason for this is to perform adjustment to a sound tone associated with the speed of the vehicle.

Note that the processing shown in FIG. 10 and the superimposition frequency are examples, and the invention is not limited thereto. A frequency, a threshold value, and the like may be set at the time of design by an actually generated sound by mounting the rotating electrical machine 1 on the vehicle. In addition, the dimensions L1 to L3 of the plurality of vibration plates 33 to 35 of the leakage magnetic flux device may also be set at the time of design by an actually generated sound by mounting the rotating electrical machine 1 on the vehicle.

Note that, in the processing shown in FIG. 10, a threshold value X of a torque is, for example, 200 (Nm), a threshold value Y of an acceleration is, for example, 0.2 (G), and a threshold value Z of the speed of the vehicle is, for example, 100 (km/h). Note that the threshold values are not limited thereto.

<Examination of Influence of Superimposed Current on Ripple>

Next, results of examination of influence on a torque ripple in a case in which a current is superimposed on the rotating electrical machine 1 will be described.

Figure 11:
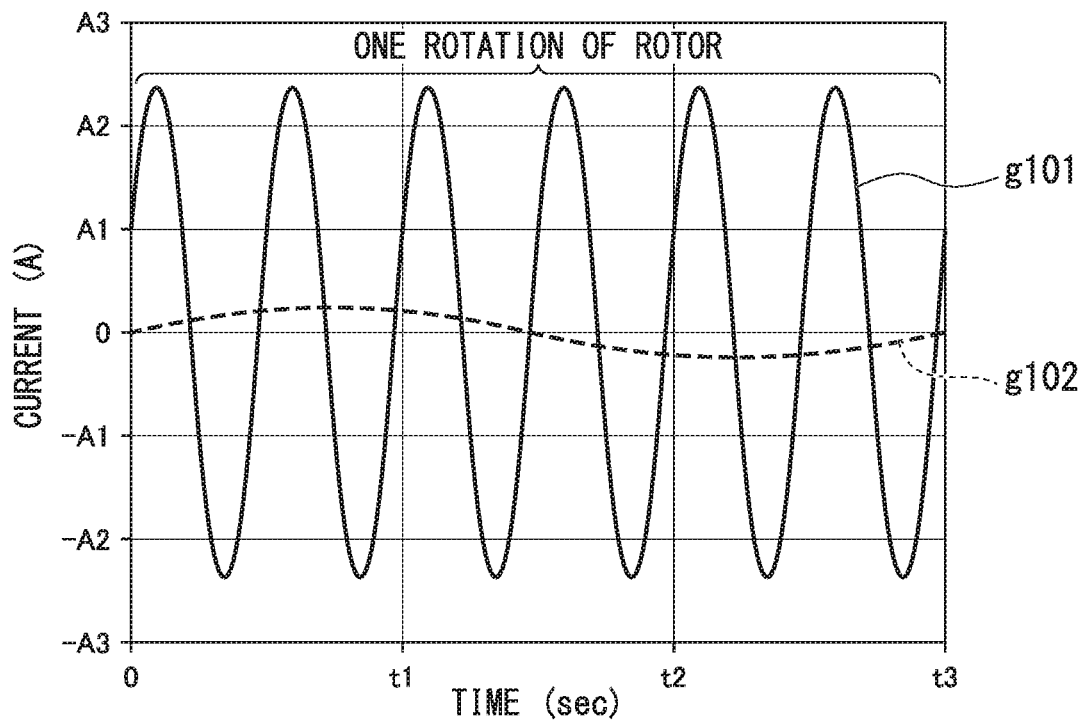
FIG. 11 is a diagram showing examination results of influence on a torque ripple in a case in which a current is superimposed on the rotating electrical machine.

FIG. 11 is a diagram for describing results of examination of influence on a torque ripple in a case in which a current is superimposed on the rotating electrical machine 1. In FIG. 11, the horizontal axis represents a time, and the vertical axis represents a current.

In addition, times 0 to t3 are equivalent to one rotation of the rotor 20. A waveform g101 is a current waveform when the rotating electrical machine 1 is rotated. A waveform g102 is a superimposition current waveform.

Here, a current (hereinafter, also referred to as a basic current) I of a current waveform during the rotation of the rotating electrical machine 1 is expressed as the following Expression (3).

$$I = I_0 \sin(\omega t + \theta) \quad (3)$$

In Expression (3), $I_0$ denotes a maximum value of a current, $\omega$ denotes a frequency, and $\theta$ denotes an angle of the rotor 20.

In addition, a current (hereinafter, also referred to as a superimposed current) I' to be superimposed is expressed as the following Expression (4).

$$I' = I'_0 \sin(\omega' t + \theta') \quad (4)$$

In Expression (4), $I'_0$ denotes a maximum value of a superimposed current, $\omega'$ denotes a frequency, and $\theta'$ denotes an angle (0 to 360 degrees) of the superimposed current.

In addition, a magnetic flux B of a magnet is expressed as the following Expression (5).

$$B = B_0 \sin(\omega t + \theta) \quad (5)$$

In Expression (5), $B_0$ denotes a maximum value of a magnetic flux.

A generated torque T generated by the rotation of the rotor 20 is proportional to the magnetic flux B of the magnet. For this reason, the generated torque T is expressed as the following Expression (6).

$$\begin{aligned}
T \propto B(I + I') &= B_0 \sin(\omega t + \theta) \times \{I_0 \sin(\omega t + \theta) + I'_0 \sin(\omega' t + \theta')\} \quad (6)\\
&= B_0 I_0 \sin^2(\omega t + \theta) + B_0 I'_0 \sin(\omega t + \theta) \sin(\omega' t + \theta')\\
&= \frac{B_0 I_0}{2} - \frac{B_0 I_0}{2} \cos 2\omega t -\\
&\quad \frac{B_0 I'_0}{2} \cos\{(\omega + \omega')t + \theta + \theta'\} +\\
&\quad \frac{B_0 I'_0}{2} \cos\{(\omega - \omega')t + \theta - \theta'\}
\end{aligned}$$

In Expression (6), a first term and a second term $\{B_0 I_0/2 - (B_0 I_0/2) \times (\cos 2\omega t)\}$ are components resulting from a basic current. Further, in Expression (6), a third term and a fourth term $[(-B_0 I'_0/2)(\cos\{(\omega+\omega')t+\theta+\theta'\}) + (B_0 I'_0/2)(\cos\{(\omega-\omega')t+\theta-\theta'\})]$ are components resulting from a superimposed current. That is, $\omega+\omega'$ and $\omega-\omega'$ components appear in a torque component by superimposing a current.

Figure 12:
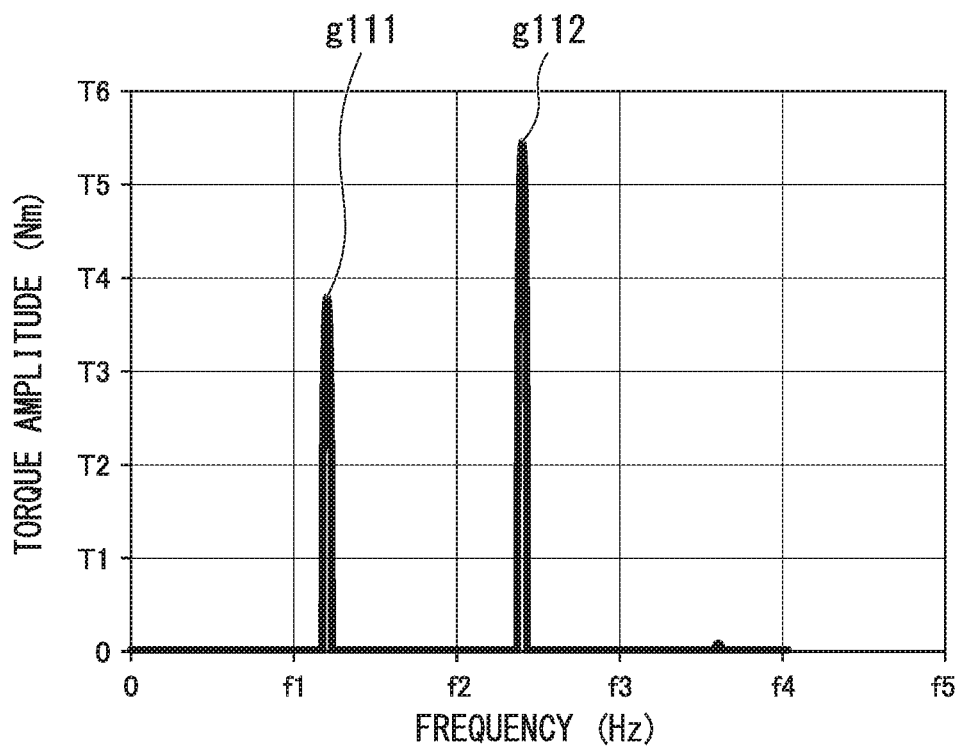
FIG. 12 is a diagram showing an example of a frequency component of a torque ripple due to a basic current.

FIG. 12 is a diagram showing an example of a frequency component of a torque ripple due to a basic current. In FIG. 12, the horizontal axis represents a frequency, and the vertical axis represents a torque amplitude.

Reference numeral g111 denotes a component due to a 36th-order wave. In addition, reference numeral g112 denotes a component due to a 72th-order wave. Note that a frequency of a basic current is ⅙ of a 36th-order wave.

Next, an example of a frequency component of a torque ripple in a case in which ½ of a frequency of a basic current is superimposed and an example of a frequency component of a torque ripple in a case in which approximately ⅙ of the frequency of the basic current is superimposed will be described.

Figure 13:
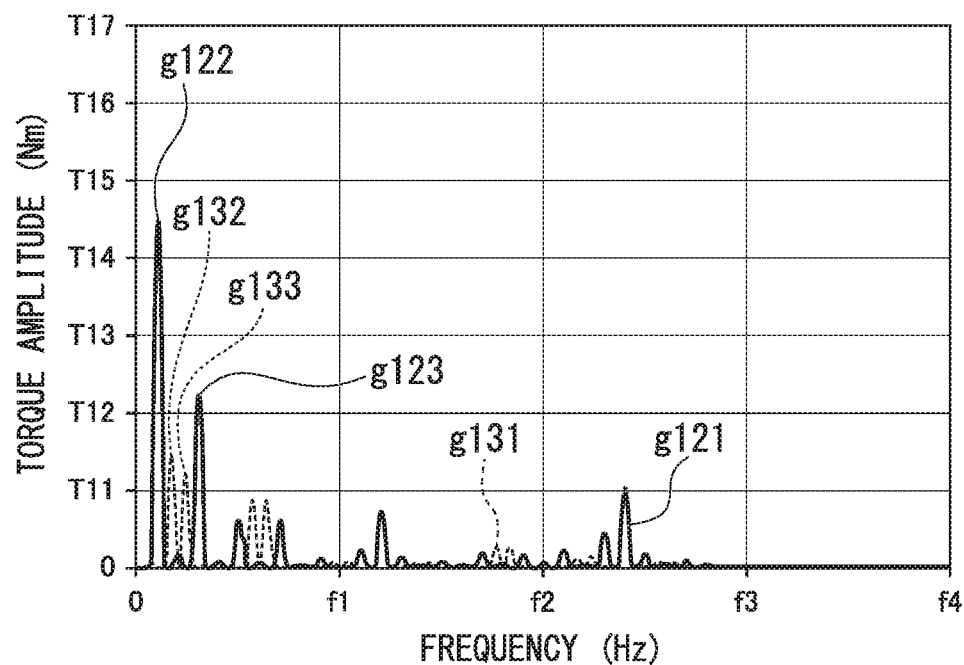
FIG. 13 is a diagram showing an example of a frequency component of a torque ripple in a case in which ½ of a frequency of a basic current is superimposed and an example of a frequency component of a torque ripple in a case in which approximately ⅙ of the frequency of the basic current is superimposed.

FIG. 13 is a diagram showing an example of a frequency component of a torque ripple in a case in which ½ of a frequency of a basic current is superimposed and an example of a frequency component of a torque ripple in a case in which approximately ⅙ of the frequency of the basic current is superimposed. In FIG. 13, the horizontal axis represents a frequency, and the vertical axis represents a torque amplitude.

Reference numeral g121 denotes a frequency component of a torque ripple in a case in which ½ of a frequency of a basic current is superimposed. In addition, reference numeral g131 denotes a frequency component of a torque ripple in a case in which ⅙ of a frequency of a basic current is superimposed.

Further, in FIG. 13, reference numeral g122 denotes (a frequency of a basic current)−(½ of the frequency of the basic current), that is, a component of Reference numeral g123 denotes (a frequency of a basic current)+(½ of the frequency of the basic current), that is, a component of $\omega+\omega'$.

Further, in FIG. 13, reference numeral g132 denotes (a frequency of a basic current)−(approximately ⅙ of the frequency of the basic current), that is, a component of $\omega-\omega'$. Reference numeral g133 denotes (a frequency of a basic current)+(approximately ⅙ of the frequency of the basic current), that is, a component of $\omega+\omega'$.

Next, an example of a frequency component of a torque ripple in a case in which 1.5 times of the frequency of a basic current is superimposed and an example of a frequency component of a torque ripple in a case in which approximately 1.33 times of the frequency of the basic current is superimposed will be described.

Figure 14:
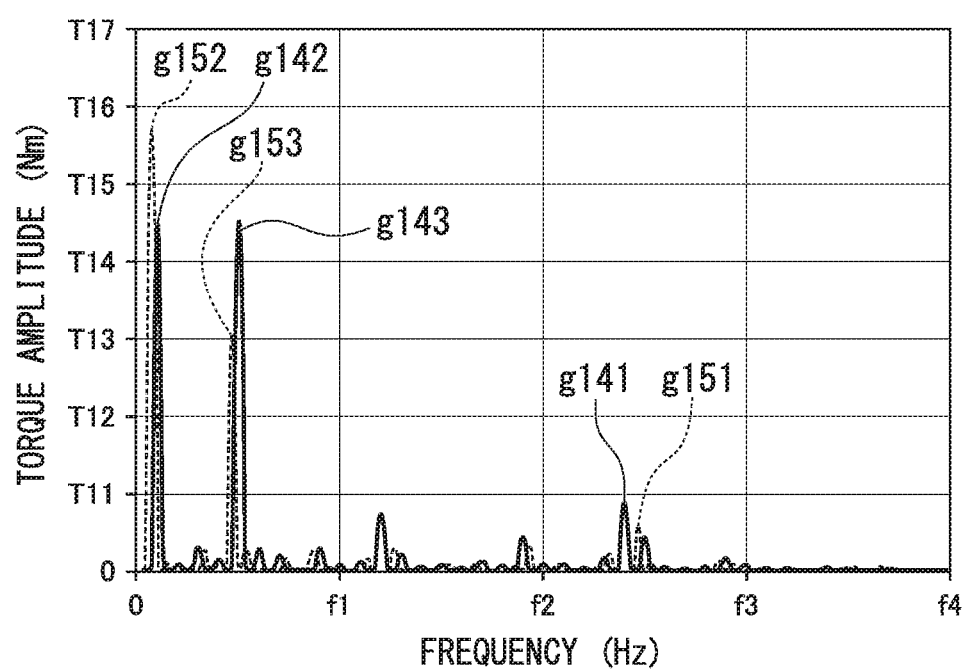
FIG. 14 is a diagram showing an example of a frequency component of a torque ripple in a case in which 1.5 times of the frequency of a basic current is superimposed and an example of a frequency component of a torque ripple in a case in which approximately 1.33 times of the frequency of the basic current is superimposed.

FIG. 14 is a diagram showing an example of a frequency component of a torque ripple in a case in which 1.5 times of the frequency of a basic current is superimposed and an example of a frequency component of a torque ripple in a case in which approximately 1.33 times of the frequency of the basic current is superimposed. In FIG. 14, the horizontal axis represents a frequency, and the vertical axis represents a torque amplitude.

Reference numeral g141 denotes a frequency component of a torque ripple in a case in which 1.5 times of the frequency of a basic current is superimposed. In addition, reference numeral g151 denotes a frequency component of a torque ripple in a case in which approximately 1.33 times of the frequency of the basic current is superimposed.

Further, in FIG. 14, reference numeral g142 denotes (a frequency of a basic current)−(1.5 times of the frequency of a basic current), that is, a component of $\omega-\omega'$. Reference numeral g143 denotes (a frequency of a basic current)+(1.5 times of the frequency of a basic current), that is, a component of $\omega+\omega'$.

Further, in FIG. 14, reference numeral g152 denotes (a frequency of a basic current)-(approximately 1.33 times of the frequency of the basic current), that is, a component of $\omega'1\omega'$. Reference numeral g153 denotes (a frequency of a basic current)+(approximately 1.33 times of the frequency of the basic current), that is, a component of $\omega+\omega'$.

Next, an example of generation of a sound (jet sound) representing a feeling of acceleration will be described.

Figure 15:
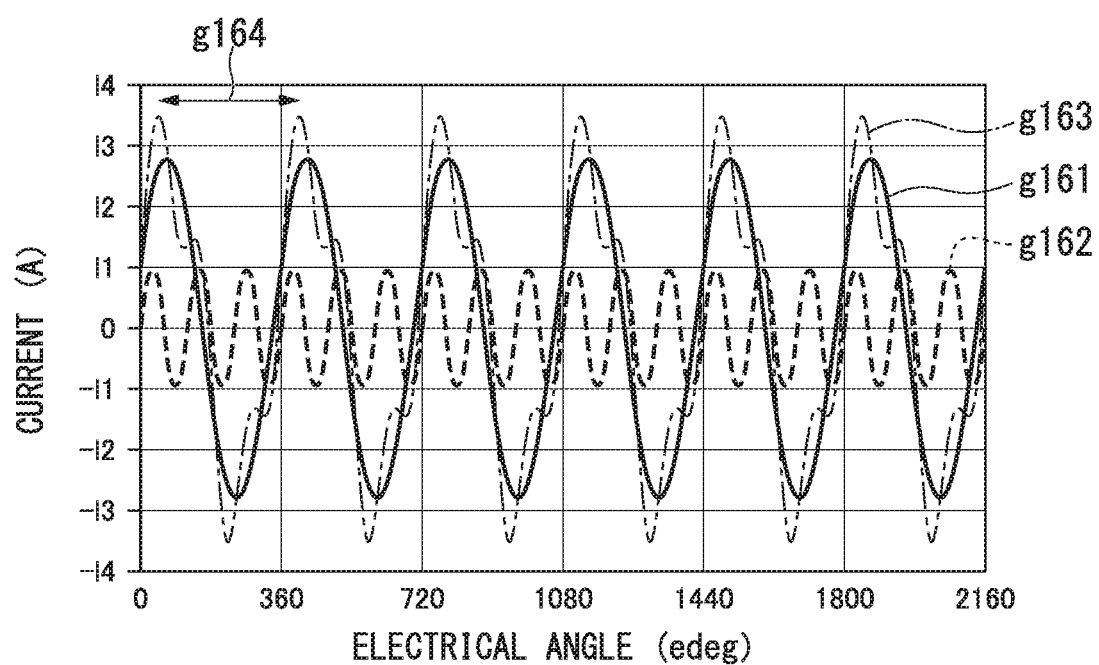
FIG. 15 is a diagram showing an example of a waveform of a sound representing a feeling of acceleration.

FIG. 15 is a diagram showing an example of a waveform of a sound representing a feeling of acceleration. In FIG. 15, the horizontal axis represents an electrical angle, and the vertical axis represents a current.

In addition, a waveform g161 represents a waveform of a basic current. A waveform g162 represents a waveform of a superimposed current. A waveform g163 represents a waveform of a composed current. Reference numeral g164 represents one period of a basic current.

As shown in FIGS. 8 and 15, in the present embodiment, a current having a frequency higher than a frequency of a basic current is superimposed in a case in which a sound (jet sound) representing a feeling of acceleration is generated.

Note that, in FIG. 15, a current value of a basic current is approximately I3 to −I3, while a current value of a superimposed current is approximately I1 to −I1 of approximately ⅓ thereof. As described above, an amplitude of the superimposed current is adjusted by the control unit 110 in accordance with the speed of the vehicle.

Next, an example of generation of a powerful sound will be described.

Figure 16:
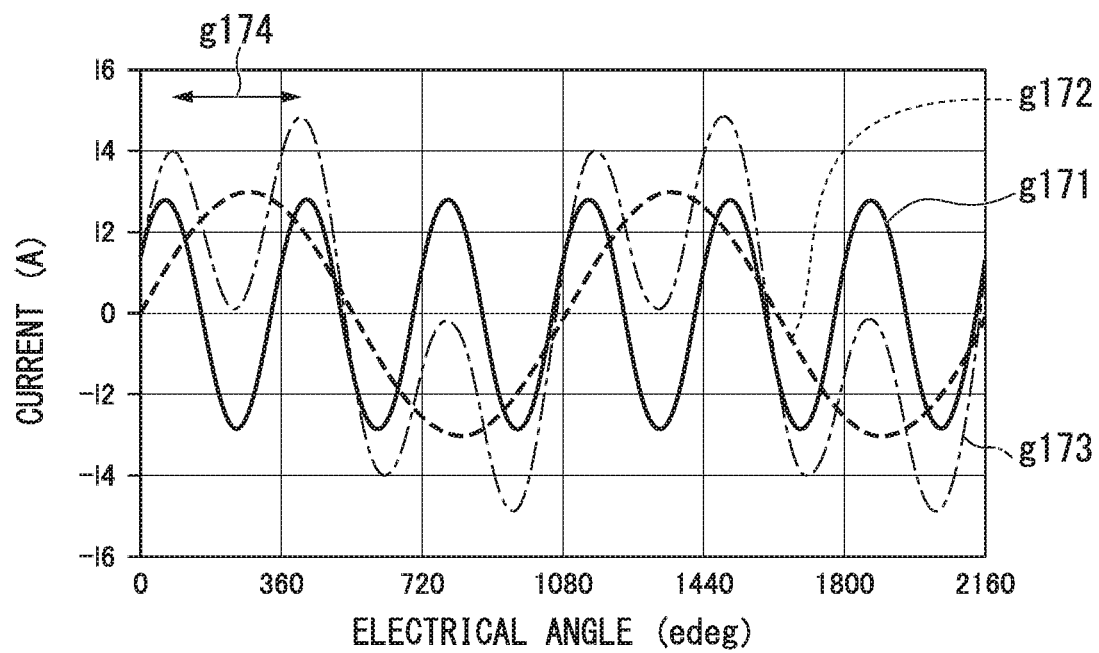
FIG. 16 is a diagram showing an example of a waveform of a sound representing a feeling of acceleration.

FIG. 16 is a diagram showing an example of a waveform of a sound representing a feeling of acceleration. In FIG. 16, the horizontal axis represents an electrical angle, and the vertical axis represents a current.

In addition, a waveform g171 represents a waveform of a basic current. A waveform g172 represents a waveform of a superimposed current. A waveform g173 represents a waveform of a composed current. Reference numeral g174 represents one period of a basic current.

As shown in FIGS. 8 and 16, in the present embodiment, a current having a frequency lower than a frequency of a basic current and having a large amplitude is superimposed in a case in which a sound representing a feeling of acceleration is generated.

In FIG. 16, a current value of a basic current is approximately I3 to −I3, while a current value of a superimposed current is equal to or greater than approximately I3 to −I3 which is the same as that of the current value of the basic current.

Note that the waveforms, the amplitudes, and the frequencies shown in FIGS. 15 and 16 are examples, and the invention is not limited thereto.

Waveforms, amplitudes, and frequencies may be set at the time of design in accordance with the size of the rotating electrical machine 1 and a vehicle on which the rotating electrical machine 1 is to be mounted.

As described above, in the present embodiment, in a case in which a generated torque is large, a harmonic current less than a first frequency is superimposed. Thereby, according to the present embodiment, in a case of a high torque and a high acceleration, it is possible to invoke a rising feeling by outputting a large sound.

Further, in the present embodiment, when an acceleration is equal to or greater than a threshold value Y, a harmonic current equal to or higher than a first frequency and less than a second frequency is superimposed. Thereby, according to the present embodiment, it is possible to invoke a rising feeling by outputting a large sound in a case of a high torque and acceleration.

Further, in the present embodiment, in a case in which the speed of the vehicle is equal to or greater than a threshold value Z, a harmonic current equal to or higher than a first frequency and less than a second frequency is superimposed. Thereby, according to the present embodiment, it is possible to invoke a rising feeling by outputting a large sound at the time of high-speed movement.

Further, in the present embodiment, the control unit 110 adjusts the amplitude of a harmonic current in accordance with the speed of the vehicle.

Thereby, according to the present embodiment, it is possible to secure a sound volume which is not drowned out by road or wind noise.

Further, in the present embodiment, the control unit 110 increases the frequency of a harmonic current in accordance with the speed of the vehicle. Thereby, according to the present embodiment, it is possible to perform adjustment to a sound tone associated with the speed of the vehicle.

Further, in the present embodiment, a basic sound is generated by an asymmetry electromagnetic portion. Thereby, according to the present embodiment, it is possible to invoke a motor sound comfortable for an occupant without applying an excessive current and degrading the basic performance of the rotating electrical machine 1.

Further, in the present embodiment, it is possible to invoke a sound having various frequencies by vibrating a vibration plate of a leakage magnetic flux device by a leakage magnetic flux. Further, in the present embodiment, it is possible to control the frequency of a sound generated by the leakage magnetic flux device by superimposing a current on the rotating electrical machine 1 in accordance with a torque, an acceleration, and a speed (vehicle speed). Thereby, according to the present embodiment, it is possible to generate a sound comfortable for an occupant by using the rotation of the rotating electrical machine 1 in accordance with a vehicle traveling state. As a result, according to the present embodiment, even when a vehicle includes the rotating electrical machine 1, it is possible to invoke a sound familiar to an occupant in the vehicle having an engine mounted thereon instead of a monotonous motor sound.

Note that all or some of the processes performed by the control unit 110 may be performed by recording a program for realizing all or some of the functions of the control unit 110 in the present invention in a computer-readable recording medium and by causing a computer system to read and execute the program recorded in the recording medium. Note that it is assumed that the "computer system" as mentioned herein includes hardware such as OS and peripheral devices. In addition, it is assumed that the "computer system" also includes a WWW system including a homepage providing environment (or a display environment).

In addition, the "computer-readable recording medium" refers to a portable medium such as a flexible disc, a magneto-optical disc, a ROM, or a CD-ROM, or a storage device such as a hard disk built into the computer system. Further, it is assumed that the "computer-readable recording medium" also includes a medium holding the program for a certain period of time like a volatile memory (RAM) inside the computer system serving as a server or a client in a case in which the program is transmitted through a network such as the Internet or through a communication line such as a telephone line.

In addition, the above-described program may be transmitted from the computer system in which the program is stored in a storage device or the like to another computer system through a transmission medium or by transmitted waves in the transmission medium. Here, the "transmission medium" transmitting the program refers to a medium having a function of transmitting information like a network (communication network) such as the Internet or a communication line (communication wire) such as a telephone line. In addition, the above-described program may be a program for realizing a portion of the above-described function. Further, the above-described program may be a so-called differential file (differential program) capable of realizing the above-described function in combination with a program which is recorded in the computer system in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rotating electrical machine control device comprising:
    a stator that generates a magnetic flux by electrifying coils mounted on a stator core;
    a sound generating device that generates a predetermined sound by vibrating a vibration plate with an electromagnetic force caused by the magnetic flux, the vibration plate being provided adjacent to the stator core;
    a rotating electrical machine;
    a sensor that detects a state of the rotating electrical machine; and
    a control unit comprising a computer system that executes program instructions stored on a computer-readable recording medium, wherein execution of the program instructions causes the control unit to control a current component superimposed on a current supplied to the rotating electrical machine on a basis of detection results of the sensor,
    wherein
    the control unit controls to vibrate the vibration plate so as to generate a first vibration sound with the electromagnetic force caused by superimposing a current having a frequency less than a first frequency on the rotating electrical machine in a case in which a torque detected by the sensor is equal to or greater than a torque threshold value,
    the control unit determines whether a speed of a vehicle detected by the sensor is equal to or greater than a vehicle speed threshold value in a case in which the torque is less than the torque threshold value,
    the control unit controls to vibrate the vibration plate so as to generate a second vibration sound with the electromagnetic force caused by superimposing a current having a frequency equal to or greater than the first frequency and equal to or less than a second frequency on the rotating electrical machine in a case in which the speed of the vehicle is equal to or greater than the vehicle speed threshold value, and
    the control unit controls not to vibrate the vibration plate so as not to generate a vibration sound in a case in which the speed of the vehicle is less than the vehicle speed threshold value.

2. The rotating electrical machine control device according to claim 1,
    wherein the control unit superimposes a current having a frequency equal to or greater than the first frequency and equal to or less than the second frequency on the rotating electrical machine in a case in which an acceleration detected by the sensor is equal to or greater than an acceleration threshold value.

3. The rotating electrical machine control device according to claim 1,
    wherein the control unit adjusts an amplitude of a superimposed current in accordance with the speed of the vehicle in a case in which the speed of the vehicle is equal to or greater than the vehicle speed threshold value.

4. The rotating electrical machine control device according to claim 1, further comprising:
    a rotor in which a magnet is mounted on a rotor core,
    wherein a non-identical shape portion different from a repetitive shape of an electromagnetic region which is set for each pole in a circumferential direction is provided on an outer peripheral surface of the rotor core and an inner peripheral surface of the stator core.

5. A rotating electrical machine control method of a rotating electrical machine control device including a rotating electrical machine, the method comprising:
    generating, by a stator, a magnetic flux by electrifying coils mounted on a stator core;
    generating, by a sound generating device, a predetermined sound by vibrating a vibration plate with an electromagnetic force caused by the magnetic flux, the vibration plate being provided adjacent to the stator core;
    detecting, by a sensor, a state of the rotating electrical machine; and
    controlling, by a control unit, a current component superimposed on a current supplied to the rotating electrical machine on a basis of the detecting, wherein the controlling the current component comprises:
        in response to determining that a torque determined by the detecting is equal to or greater than a torque threshold value, controlling, by the control unit, to vibrate the vibration plate so as to generate a first vibration sound with the electromagnetic force caused by superimposing a current having a frequency less than a first frequency on the rotating electrical machine, and
        in response to determining that the torque is less than the torque threshold value:
            determining, by the control unit, whether a speed of a vehicle determined by the detecting is equal to or greater than a vehicle speed threshold value, in response to determining that the speed of the vehicle is equal to or greater than the vehicle speed threshold value, controlling, by the control unit, to vibrate the vibration plate so as to generate a second vibration sound with the electromagnetic force caused by superimposing a current having a frequency equal to or greater than the first frequency and equal to or less than a second frequency on the rotating electrical machine, and in response to determining that the speed of the vehicle is less than the vehicle speed threshold value, controlling, by the control unit, to not vibrate the vibration plate so as not to generate a vibration sound.

6. A rotating electrical machine control device comprising:

a rotating electrical machine;

a sensor that detects a state of the rotating electrical machine; and a control unit comprising a computer system that executes program instructions stored on a computer-readable recording medium, wherein execution of the program instructions causes the control unit to control a current component superimposed on a current supplied to the rotating electrical machine based on detection results of the sensor, wherein the control unit controls to superimpose a current having a frequency less than a first frequency on the rotating electrical machine in a case in which a torque included in the detection results is equal to or greater than a torque threshold value, the control unit subsequently determines whether a speed of a vehicle included in the detection results is equal to or greater than a vehicle speed threshold value in a case in which the torque is less than the torque threshold value, the control unit controls to superimpose a current having a frequency equal to or greater than the first frequency and equal to or less than a second frequency on the rotating electrical machine in a case in which the speed of the vehicle is equal to or greater than the vehicle speed threshold value, and the control unit controls not to generate a vibration sound in a case in which the speed of the vehicle is less than the vehicle speed threshold value.

7. A rotating electrical machine control method, comprising:

detecting, by a sensor, a state of a rotating electrical machine;

controlling, by a control unit, a current component superimposed on a current supplied to the rotating electrical machine based on detection results of the sensor, wherein the controlling comprises:

in response to determining that a torque included in the detection results is equal to or greater than a torque threshold value, superimposing a current having a frequency less than a first frequency on the rotating electrical machine; and in response to determining that the torque is less than the torque threshold value:

in response to determining that a speed of the vehicle included in the detection results is equal to or greater than the vehicle speed threshold value, superimposing a current having a frequency equal to or greater than the first frequency and equal to or less than a second frequency on the rotating electrical machine; and in response to determining that the speed of the vehicle is less than the vehicle speed threshold value, controlling to not generate a vibration sound.

* * * * *